(12) United States Patent
Hellge et al.

(10) Patent No.: US 12,555,308 B2
(45) Date of Patent: Feb. 17, 2026

(54) 3D SCENE DESCRIPTION DATA, SCENE RENDERING APPARATUS FOR RENDERING A SCENE FROM 3D SCENE DESCRIPTION DATA, AND APPARATUS FOR ENCODING A SCENE INTO 3D SCENE DESCRIPTION DATA

(71) Applicant: Fraunhofer-Gesellschaft zur Förderung der angewandten Forschung e.V., Munich (DE)

(72) Inventors: Cornelius Hellge, Berlin (DE); Thomas Schierl, Berlin (DE); Peter Eisert, Berlin (DE); Anna Hilsmann, Berlin (DE); Robert Skupin, Berlin (DE); Yago Sánchez De La Fuente, Berlin (DE); Wieland Morgenstern, Berlin (DE); Gurdeep Singh Bhullar, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 237 days.

(21) Appl. No.: 18/455,161

(22) Filed: Aug. 24, 2023

(65) Prior Publication Data

US 2023/0394744 A1    Dec. 7, 2023

Related U.S. Application Data

(63) Continuation of application No. PCT/EP2022/054699, filed on Feb. 24, 2022.

(30) Foreign Application Priority Data

Feb. 27, 2021  (EP) .................................... 21159798

(51) Int. Cl.
*G06T 15/20*  (2011.01)
*G06T 13/40*  (2011.01)
*G06T 17/20*  (2006.01)

(52) U.S. Cl.
CPC .............. *G06T 15/20* (2013.01); *G06T 13/40* (2013.01); *G06T 17/20* (2013.01)

(58) Field of Classification Search
CPC .......... G06T 15/20; G06T 13/40; G06T 17/20
See application file for complete search history.

(56) References Cited

U.S. PATENT DOCUMENTS 6,359,619 B1    3/2002   Waters et al.
2019/0156545 A1*  5/2019   Horn ....................... G06T 13/20
(Continued)

OTHER PUBLICATIONS

Dupont De Dinechin Gregoire et al., "Virtual Agents from 360° Video for Interactive Virtual Reality", 32nd International Conference on Computer Animation and Social Agents Computer Animation and Social Agents (CASA 19), Jul. 1-3, 2019, DOI:10.1145/3328756.3328775, Jul. 1, 2019, Paris, France, URL: https://hal.archives-ouvertes.fr/hal-02155594/document, Jun. 10, 2022, XP055930107.

(Continued)

*Primary Examiner* — Michelle Chin
(74) *Attorney, Agent, or Firm* — Bridgeway IP Law Group, PLLC; Jihun Kim

(57) ABSTRACT

Scene rendering apparatus for rendering a scene from a 3D scene description data, configured to derive, from the 3D scene description data, first data defining a 3D object and second data defining an animation of the object and trigger condition information which defines a condition for viewing position and/or viewing orientation. Additionally, the scene rendering apparatus is configured to check whether the condition for viewing position and/or viewing orientation is (Continued)

met, and responsive to the condition for viewing position and/or viewing orientation being met, trigger the animation of the object.

15 Claims, 15 Drawing Sheets

(56) References Cited

U.S. PATENT DOCUMENTS

2021/0166459 A1* 6/2021 Miller, IV ............. G06F 1/1637
2021/0256751 A1* 8/2021 De Ridder ............. G06T 13/20

OTHER PUBLICATIONS

Wang Isaac Wang et al., "Exploring Virtual Agents for Augmented Reality", Human Factors in Computing Systems, ACM, May 2, 2019, Penn Plaza, Suite 701 New York NY 10121-0701 USA, DOI:10.1145/3290605.3300511, ISBN 978-1-4503-5971-9, pp. 1-12, XP058575498, May 4-9, 2019, Glasgow, Scotland, UK.
Dunne Mark et al., "TSB Technique: Increasing a User's Sense of Immersion with Intelligent Virtual Agents", Jan. 1, 2010, AICS 2010 NUI Galway, Ireland, URL: https://www.researchgate.net/publication/215651857_TSB_Technique_Increasing_a_User's_Sense_of_Immersion_with_Intelligent_Virtual_Agents, Jun. 10, 2022, XP055930117.
Jisc, "Information technology—Coded representation of immersive media—Part 14: Scene description for MPEG media", ISO/IEC Dis 23090-14:2021(E)—ISO/IEC JTC 1/SC 29/WG 03.
Se Woon Jeon, "Office Action for Korean Application No. 10-2023-7032438", Jul. 15, 2025, KIPO, Republic of Korea.

\* cited by examiner

```
"animations": [
  {
    "name": "Animate all properties of one node with different samplers",
    "channels": [
      {
        "sampler": 0,
        "target": {
          "node": 1,
          "path": "rotation"
        }
      },
      {
        "sampler": 1,
        "target": {
          "node": 1,
          "path": "scale"
        }
      },
    ],
    "samplers": [
      {
        "input": 4,
        "interpolation": "LINEAR",
        "output": 5
      },
      {
        "input": 4,
        "interpolation": "LINEAR",
        "output": 6
      }
    ]
  }
```

```
aligned(8) LimitationTransformationSample() {
    for (unsigned int(32) i = 0 ; i < number_of_joints_to_transform; i++){
        signed int (32) max_translation_x;
        signed int (32) max_translation_y;
        signed int (32) max_translation_z;
        signed int (32) max_rotation_w;
        signed int (32) max_rotation_x;
        signed int (32) max_rotation_y;
        signed int (32) max_rotation_z;
    }
}
```

```
class VerticesCorrespondenceSampleEntry(type) extends
MetaDataSampleEntry(type) {
    VerticesCorrespondenceConfigBox (); // mandatory
    Box[] other_boxes; // optional
} class VerticesCorrespondenceConfigBox extends FullBox('vcor', 0, 0) {
    unsigned int(8) correspondences_length;
    unsigned int(32) num_correspondences;
    unsigned int(2) correspondence_type
    }
}
```

FIG 8

```
aligned(8) VerticesCorrespondenceSample() {
    for (i = 0; i < num_correspondences; i++){
        if (correspondence_type == 0)
            unsigned int(8* correspondences_length) correspondences[i]
        else if (correspondence_type == 1){
            unsigned int(32) vert_idx[i];
            unsigned int(8* correspondences_length) correspondences[i]
        }
    }
}
```

FIG 9

```
{
  "meshes": [ {
    "primitives" : [ { // This is the mesh for the model
      "attributes" : {
        "POSITION" : 1,
        "JOINTS_0" : 2,
        "WEIGHTS_0" : 3
      },
      "indices":0,
      "mode": 4,
      "targets" : [
              {
                "POSITION" : 6,
                "NORMAL" : 7
              },
              {
                "POSITION" : 8,
                "NORMAL" : 9
              },
    }, {
     "primitives" : [ {// This is the mesh for the volumetric video "attributes" : {
         "POSITION" : 5,
   . . .
   . . .
       },
       "extensions":[
  "name" : "Mesh-dependent"
       "MPEG_mesh_linking ": {
         {                                    ─218
            "correspondence": 10,◄
            "mesh" : 0 ◄                       ─270
            "jointsUpdateTrack" : 0 ◄
         }                                    ─260
      ]
     }
    ]
   }
```

Fig. 11

```
class JointsConfigBox extends FullBox('jcob', 0, 0) {
    unsigned int(8) number_of_joints_to_transform;
    for (unsigned int i= 0 ; i < number_of_joints_to_transform; i++){
        unsigned int (8) joints_to_transform[i];
    }
    unsigned int(1) pose_blend_shape_weights_present_flag;
    if (pose_blend_shape_weights_present_flag == 1){
        unsigned int(15) num_pose_blend_shape_weights;
    }
}
```

Fig. 12

```
aligned(8) JointsTransformationSample() {
    for (unsigned int(32) i = 0 ; i < number_of_joints_to_transform; i++){
        signed int (32) matrix[i]
    }
    for (unsigned int(32) i = 0 ; i < num_pose_blend_shape_weights; i++){
        signed int (32) weight[i]
    }
}
```

Fig. 13

```
class JointsConfigBox extends FullBox('jcob', 0, 0) {
    unsigned int(8) number_of_joints_to_transform;
    for (unsigned int i = 0 ; i < number_of_joints_to_transform; i++){
        unsigned int (8) joints_to_transform[i];
    }
    unsigned int(1) subset_pose_blend_shapes;
    unsigned int(1) pose_blend_shape_weights_present_flag;
    if (pose_blend_shape_weights_present_flag == 1){
        unsigned int(15) num_pose_blend_shape_weights;
    }
}
```

Fig. 14

```
aligned(8) JointsTransformationSample() {
    for (unsigned int(32) i = 0 ; i < number_of_joints_to_transform; i++){
    signed int (32) matrix[i]
    }
    for (unsigned int(32) i = 0 ; i < num_pose_blend_shape_weights; i++){
        signed int (32) weight[i]
        if (subset_pose_blend_shapes == 1)
            unsigned int(15) morph_target_index;
    }
}
```

Fig. 15

```
aligned(8) JointsTransformationSample() {
    for (unsigned int(32) i = 0 ; i < number_of_joints_to_transform; i++){
    signed int (32) matrix[i]
    }
    for (unsigned int(32) i = 0 ; i < num_pose_blend_shape_weights; i++){
    signed int (32) weight[i]
    if (subset_pose_blend_shapes == 1)
        unsigned int(15) morph_target_index;
    }
    signed int (32) matrix[i] // applies to the root node, i.e. to the whole object
}
```

Fig. 19

3D SCENE DESCRIPTION DATA, SCENE RENDERING APPARATUS FOR RENDERING A SCENE FROM 3D SCENE DESCRIPTION DATA, AND APPARATUS FOR ENCODING A SCENE INTO 3D SCENE DESCRIPTION DATA

CROSS-REFERENCES TO RELATED APPLICATIONS

This application is a continuation of copending International Application No. PCT/EP2022/054699, filed Feb. 24, 2022, which is incorporated herein by reference in its entirety, and additionally claims priority from European Application No. EP 21 159 798.4, filed Feb. 27, 2021, which is incorporated herein by reference in its entirety.

BACKGROUND OF THE INVENTION

Embodiments according to the invention relate to 3D scene description data, Scene rendering apparatuses for rendering a scene from the 3D scene description data, and apparatuses for encoding a scene into the 3D scene description data. The embodiments provide scene description enhancements for volumetric videos.

Currently there exists a graphics language transmission format (glTF) representing a standard file format for three-dimensional scenes and models. There exist technics enabling a consumption of timed data in a scene, e.g., by defining features of a scene that describe how to get the timed data and how a rendering process handles the data once it is decoded.

However, there exist still some drawbacks in the transformation of 3D objects, especially in the context of animations/interactivity of 3D objects in a scene.

Therefore, it is desired to provide concepts for improving transformations of 3D objects, e.g., in terms of a flexibility in triggering such transformations and/or in terms of a visual quality of the volumetric video and/or in terms of transferring the transformations to a volumetric scan of the 3D object. Additionally, it might be desired to provide concepts for rendering volumetric video coding more efficient.

SUMMARY

An embodiment may have a scene rendering apparatus for rendering a scene from a 3D scene description data, configured to derive, from the 3D scene description data, first data defining a 3D object and second data defining an animation of the object and trigger condition information which defines a condition for viewing position and/or viewing orientation; and check whether the condition for viewing position and/or viewing orientation is met, and responsive to the condition for viewing position and/or viewing orientation being met, trigger the animation of the object.

Another embodiment may have a scene rendering apparatus for rendering a scene from a 3D scene description data, configured to derive, from the 3D scene description data, first data defining a movable 3D object, and second data defining a movability of the movable object and movement constraint information which defines constraints for the movability of the movable 3D object.

Another embodiment may have a method for rendering a scene from a 3D scene description data, comprising deriving, from the 3D scene description data, first data defining a 3D object and second data defining an animation of the object and trigger condition information which defines a condition for viewing position and/or viewing orientation; and checking whether the condition for viewing position and/or viewing orientation is met, and responsive to the condition for viewing position and/or viewing orientation being met, triggering the animation of the object.

Another embodiment may have a method for rendering a scene from a 3D scene description data, comprising deriving, from the 3D scene description data, first data defining a movable 3D object, and second data defining a movability of the movable object and movement constraint information which defines constraints for the movability of the movable 3D object.

Another embodiment may have a non-transitory digital storage medium having a computer program stored thereon to perform the method 19 when said computer program is run by a computer.

Another embodiment may have a non-transitory digital storage medium having a computer program stored thereon to perform the method 20 when said computer program is run by a computer.

In accordance with a first aspect of the present invention, the inventors of the present application realized that one problem encountered when trying to trigger an application of an animation to a 3D object stems from the fact that it is only possible to trigger an animation in response to user input or by using a time-based triggering. According to the first aspect of the present application, this difficulty is overcome by enabling a position-based and/or an orientation-based triggering of the animations. The inventors found, that it is advantageous to trigger a transformation/animation of the 3D object in response to a predefined position and/or a predefined orientation of a viewer of the 3D scene. This is based on the idea that a position and/or orientation dependent triggering of animations improves a quality of 3D scenes and a flexibility in rendering 3D scenes. The position and/or orientation dependent triggering of animations enables a viewer to interact with a scene defined by 3D scene description data in a more flexible way.

Accordingly, in accordance with a first aspect of the present application, a scene rendering apparatus for rendering a scene from a 3D scene description data is configured to derive, from the 3D scene description data, first data, second data and trigger condition information. The 3D scene description data comprises the first data, the second data and the trigger condition information and an apparatus for encoding the scene into the 3D scene description data is configured to provide the 3D scene description data with the first data, the second data and the trigger condition information. The first data defines a 3D object, for instance, by way of 1) a first mesh, 2) optionally, a skeleton, and 3) optionally, a second mesh and correspondence information. For the mesh definition, a list of vertex positions and/or a definition of faces formed by the vertices, at a default pose, such as a T pose, may be used. The second data defines an animation of the 3D object, for instance, by way of a skeleton movement. The trigger condition information defines a condition for a viewing position and/or a viewing orientation, e.g., of a viewer of the scene. The condition for the viewing position and/or for the viewing orientation may define a predetermined position and/or a predetermined orientation or may define a set of several predetermined positions and/or predetermined orientations, e.g., a range of predetermined positions and/or a range of predetermined orientations. The scene rendering apparatus is configured to check whether the condition for the viewing position and/or the viewing orientation is met, e.g., by the viewer of the scene. Additionally, the scene rendering apparatus is configured to, responsive to the condition for the viewing position and/or the viewing orientation being met, trigger the animation of the 3D object.

An embodiment is related to a method, wherein the method comprises features described with regard to the first aspect. The method is based on the same considerations as the above-described scene rendering apparatus and/or the apparatus for encoding. The method can, by the way, be completed with all features and functionalities, which are also described with regard to the scene rendering apparatus and/or the apparatus for encoding. Functional features described with regard to the scene rendering apparatus and/or the apparatus for encoding may represent steps of the method.

In accordance with a second aspect of the present invention, the inventors of the present application realized that one problem encountered when trying to apply an animation/transformation to a 3D object in response to a user interaction stems from the fact that a pose of the 3D object at the instance of interaction might not correspond to a pose, which is subject of the animation. According to the second aspect of the present application, this difficulty is overcome by restricting the movement of the 3D object, e.g., dependent on the pose of the 3D object in a volumetric video. The inventors found, that it is advantageous to indicate a movability of the 3D object and/or constraints for the movability of the 3D object. This is based on the idea that geometry artefact of the 3D object, due to the animation, can be reduced, if only animations suitable for the pose of the 3D object are allowed and/or if the animation is applied to the 3D object under certain constraints, wherein, for example, the movability and the constraints might be pose-dependent, i.e. dependent on the pose of the 3D object at an application of the respective animation. The movability may indicate animatable parts of the 3D object, e.g., spatial parts of the 3D object, which can be transformed by an animation. The constraints may indicate a space of freedom for one or more joints of the 3D object, like limitations for transformations. For example, the constraints may comprise information regarding translation/rotation limits for certain joints of the 3D object. This feature efficiently reduces visual problems due to animations applied to a 3D object in response to a user interaction. The movability and/or the constraints may be indicated in 3D scene description data for certain time instants and/or time durations of the volumetric video.

Accordingly, in accordance with a second aspect of the present application, a scene rendering apparatus for rendering a scene from a 3D scene description data is configured to derive, from the 3D scene description data, first data and second data. The 3D scene description data comprises the first data and the second data and an apparatus for encoding the scene into the 3D scene description data is configured to provide the 3D scene description data with the first data and the second data. The first data defines a movable 3D object, for instance, by way of 1) a first mesh, 2) optionally, a second mesh and correspondence information. For the mesh definition, a list of vertex positions and/or a definition of faces formed by the vertices, at a default pose, such as a T pose, may be used. The second data defines a movability of the movable 3D object, for instance, by defining a skeleton and morph targets, and a movement constraint information for the movability of the movable 3D object.

An embodiment is related to a method, wherein the method comprises features described with regard to the second aspect. The method is based on the same considerations as the above-described scene rendering apparatus and/or the apparatus for encoding. The method can, by the way, be completed with all features and functionalities, which are also described with regard to the scene rendering apparatus and/or the apparatus for encoding. Functional features described with regard to the scene rendering apparatus and/or the apparatus for encoding may represent steps of the method.

In accordance with a third aspect of the present invention, the inventors of the present application realized that one problem encountered when trying to animate/transform a 3D object stems from the fact that an animation/transformation information, a 3D model mesh, a volumetric scan mesh and correspondences between the two meshes are provided for a 3D object, wherein the correspondences are needed to transfer the transformations in the model mesh of the 3D object to the volumetric scan mesh of the 3D object. According to the third aspect of the present application, this difficulty is overcome by restricting a provision or derivation of correspondences between the two meshes to correspondences associated with a subpart of the model mesh and/or volumetric scan mesh. The inventors found, that it is advantageous to provide or derive only correspondences associated with a subpart of the respective mesh, which, for example, is affected by the animation/transformation of the 3D object. This is based on the idea that an efficiency in providing and rendering a scene with a movable 3D object can be increased, if only relevant correspondences are provided or derived. The amount of needed data is therefore reduced, i.e. signalization costs can be reduced.

Accordingly, in accordance with a third aspect of the present application, a scene rendering apparatus for rendering a scene from a 3D scene description data is configured to derive, from the 3D scene description data first mesh information, moving information, second mesh information and correspondence information. The 3D scene description data comprises the first mesh information, the moving information, the second mesh information and the correspondence information and an apparatus for encoding the scene into the 3D scene description data is configured to provide the 3D scene description data with the first mesh information, the moving information, the second mesh information and the correspondence information. The first mesh information provides information on a definition of a first mesh of a movable 3D object, for instance, a list of vertex positions and/or a definition of faces formed by the vertices, at a default pose, such as a T pose. The first mesh may correspond to or represent a model mesh. The moving information indicates, e.g., to the scene rendering apparatus, how to move, e.g., in response to user interaction, or via signaled default movement instructions, the first mesh, for instance, by defining a skeleton with which a skinning transform is associated which defines a movement of the first mesh caused by the skeleton movement, and morph targets. The second mesh information provides information on a definition of a second mesh of the movable 3D object, for instance, a list of vertex positions and/or a definition of faces formed by the vertices. The second mesh information may stem from a volumetric scan. The second mesh may be regarded as defining the actual hull of the 3D object. The correspondence information defines a correspondence between portions of the first mesh and the second mesh so that the correspondence information enables, e.g. the scene rendering apparatus, to establish a mapping from the first mesh to the second mesh. Additionally, the scene description/rendering apparatus is configured to derive from the 3D scene description data an information on which subpart of the first mesh and/or which subpart of the second mesh the correspondence information relates to. Note that, accordingly, the correspondence is a kind of concordance mapping linking a portion, such as a vertex of a volumetric video mesh (second mesh) to a face of the model mesh (first mesh). And then the client may establish the mapping which yields the relative location of a vertex of the scan to the mapped face of the model mesh. The 3D scene description data comprises the information on which subpart of the first mesh and/or which subpart of the second mesh the correspondence information relates to and an apparatus for encoding the scene into the 3D scene description data is configured to provide the 3D scene description data with the information on which subpart of the first mesh and/or which subpart of the second mesh the correspondence information relates to.

An embodiment is related to a method, wherein the method comprises features described with regard to the third aspect. The method is based on the same considerations as the above-described scene rendering apparatus and/or the apparatus for encoding. The method can, by the way, be completed with all features and functionalities, which are also described with regard to the scene rendering apparatus and/or the apparatus for encoding. Functional features described with regard to the scene rendering apparatus and/or the apparatus for encoding may represent steps of the method.

In accordance with a fourth aspect of the present invention, the inventors of the present application realized that one problem encountered when trying to animate/transform a 3D object stems from the fact that an animation/transformation applied to a 3D model mesh might have to be transferred to a volumetric scan mesh of the 3D object. According to the fourth aspect of the present application, this difficulty is overcome by transforming a pose of the model mesh to a reference pose to establish a mapping between the model mesh and the volumetric scan mesh. Especially, the pose of the model mesh may be transformed to the reference pose by applying skeleton modifications of a skeleton of the 3D object and by applying morph targets. The inventors found, that it is advantageous to use morph targets for this transformation. This is based on the idea that pose transformations by means of skeleton modifications only could result in an erroneous mapping between the model mesh and the volumetric scan mesh, if a skinning process applied to transform the model mesh to the reference pose contains artifacts. Faces of the model mesh determined by the transformed vertices may not be correct and therefore the entire mapping of the model mesh to the volumetric scan mesh may not be correct. The inventors found that pose-blend shape information, i.e. morph targets, can correct such errors. Therefore an improvement of a visual quality of a 3D scene is achieved. Additionally, an efficiency and an accuracy in establishing the mapping can be improved.

Accordingly, in accordance with a fourth aspect of the present application, a scene rendering apparatus for rendering a scene from a 3D scene description data is configured to derive, from the 3D scene description data, first mesh information, moving information, second mesh information and correspondence information. The 3D scene description data comprises the first mesh information, the moving information, the second mesh information and the correspondence information and an apparatus for encoding the scene into the 3D scene description data is configured to provide the 3D scene description data with the first mesh information, the moving information, the second mesh information and the correspondence information. The first mesh information provides information on a definition of a first mesh of a movable 3D object, for instance, by a list of vertex positions and/or a definition of faces formed by the vertices, at a default pose, such as a T pose. The first mesh may correspond to or represent a model mesh. The moving information indicates, e.g., to the scene rendering apparatus, how to move, e.g., in response to user interaction, or via signaled default movement instructions, the first mesh, for instance, by defining a skeleton with which a skinning transform is associated which defines a movement of the first mesh caused by the skeleton movement, and morph targets. The moving information includes a definition of a skeleton of the movable 3D object, e.g., skeleton definition plus skinning transform. The second mesh information provides information on a definition of a second mesh of the movable 3D object, for instance, by a list of vertex positions and/or a definition of faces formed by the vertices. The second mesh information may stem from a volumetric scan. The second mesh may be regarded as defining the actual hull of the 3D object. The correspondence information defines a correspondence between portions of the first mesh and the second mesh so that the correspondence information enables, e.g., the scene rendering apparatus, to establish a mapping from the first mesh to the second mesh. The scene description/rendering apparatus is further configured to derive from the 3D scene description a reference pose information on a movement of the first mesh to assume a reference pose, the reference pose information comprising a skeleton movement definition, e.g., from the default pose to the reference pose, and an indication of a weighted average of morph targets. The 3D scene description data may provide the skeleton movement definition and the indication of the weighted average of morph targets separately. Each morph target defines a compensating deformation of the first mesh for assuming a respective primitive pose. Thus, the compensation deformation for the reference pose, for example, is composed of a weighted average of compensating deformations of the primitive poses. The 3D scene description data comprises the reference pose information and an apparatus for encoding the scene into the 3D scene description data is configured to provide the 3D scene description data with the reference pose information. Additionally, the scene description/rendering apparatus is configured to perform, using the reference pose information, the establishing of the mapping from the first mesh to the second mesh with the first mesh assuming the reference pose.

An embodiment is related to a method, wherein the method comprises features described with regard to the fourth aspect. The method is based on the same considerations as the above-described scene rendering apparatus and/or the apparatus for encoding. The method can, by the way, be completed with all features and functionalities, which are also described with regard to the scene rendering apparatus and/or the apparatus for encoding. Functional features described with regard to the scene rendering apparatus and/or the apparatus for encoding may represent steps of the method.

In accordance with a fifth aspect of the present invention, the inventors of the present application realized that one problem encountered when trying to animate/transform a 3D object stems from the fact that morph targets/pose-blend shapes may be applied to a mesh of the 3D object to animate/transform the 3D object. According to the fifth aspect of the present application, this difficulty is overcome by combining and weighting only some morph targets/pose-blend shapes out of a set of morph targets/pose-blend shapes. The inventors found, that it is advantageous to indicate the morph targets/pose-blend shapes relevant for the respective animation/transformation of the 3D object together with weights. This is based on the idea that specifically weighted morph targets/pose-blend shapes can efficiently transform/animate the 3D object and/or efficiently correct or improve pose transformations due to skeleton modifications/transformations of a skeleton of the 3D object. Therefore an improvement of a visual quality of a 3D scene is achieved. This aspect may also be advantageous for the aforementioned fourth aspect to improve the establishing of the mapping between two meshes associated with the 3D object.

Accordingly, in accordance with a fifth aspect of the present application, a scene rendering apparatus for rendering a scene from a 3D scene description data is configured to derive, from the 3D scene description data first mesh information, moving information and an information on a plurality of morph targets. The 3D scene description data comprises the first mesh information, the moving information and the information on the plurality of morph targets and an apparatus for encoding the scene into the 3D scene description data is configured to provide the 3D scene description data with the first mesh information, the moving information and the information on the plurality of morph targets. The first mesh information provides information on a definition of a mesh, e.g., a first mesh, of a movable 3D object, for instance, by a list of vertex positions and/or a definition of faces formed by the vertices, at a default pose, such as a T pose. The moving information indicates, e.g., to the scene rendering apparatus, how to move, e.g., in response to user interaction, or via signaled default movement instructions, the mesh. The moving information includes a definition of a skeleton of the movable 3D object. The information on the plurality of morph targets provides information on the morph targets of the plurality of morph targets, wherein each morph target defines a compensating deformation of the first mesh for assuming a respective primitive pose. Additionally, the scene description/rendering apparatus is configured to further derive from the 3D scene description an information on a default movement of the movable 3D object, including a default skeleton movement of the moveable 3D object, so as to assume a default pose, and, for the default poses, an indication of a subset of morph targets out of the plurality of morph targets, and for each morph target of the subset, a weight so that the subset of morph targets, weighted according to the weight for each morph target of the subset, is indicative of a composed compensating deformation of the first mesh for assuming the default pose. The 3D scene description data comprises the information on the default movement of the movable 3D object, including the default skeleton movement of the moveable 3D object, so as to assume the default pose, and, for the default poses, the indication of the subset of morph targets out of the plurality of morph targets, and for each morph target of the subset, a weight so that the subset of morph targets, weighted according to the weight for each morph target of the subset, is indicative of a composed compensating deformation of the first mesh for assuming the default pose. The apparatus for encoding the scene into the 3D scene description data is configured to provide the 3D scene description data with all this information.

An embodiment is related to a method, wherein the method comprises features described with regard to the fifth aspect. The method is based on the same considerations as the above-described scene rendering apparatus and/or the apparatus for encoding. The method can, by the way, be completed with all features and functionalities, which are also described with regard to the scene rendering apparatus and/or the apparatus for encoding. Functional features described with regard to the scene rendering apparatus and/or the apparatus for encoding may represent steps of the method.

In accordance with a sixth aspect of the present invention, the inventors of the present application realized that one problem encountered when trying to animate/transform a 3D object stems from the fact that the 3D object has to be animated/transformed in a timely manner. According to the sixth aspect of the present application, this difficulty is overcome by providing semantic information for morph targets to be applied for a certain pose of the 3D object or by indicating a model, so that the weights to be applied for a certain pose of the 3D object can be derived in a fast way using the model. The inventors found that the 3D object can be animated/transformed in a more efficient way, if it is clear for a scene rendering apparatus to which pose the provided morph-targets relate to or if the scene rendering apparatus can use a model to determine a weighted combination of morph targets. This is based on the idea that the model, like a human body model, and/or the semantic information, like an assignment of each morph target to a joint, can provide an insight on how a combination of morph targets may improve a visual quality of a transformed 3D object and thus enable the scene rendering apparatus to determine the weighted combination of morph targets on its own in a fast way. Thus, it is not necessary to explicitly indicate for each possible pose of the 3D movable 3D object the morph targets to be combined together with the weights for the morph targets. This reduces efficiently an amount of information to be comprised by the 3D scene description data, whereby also a signalization cost is reduced. At the same time the reduced amount of information does not significantly reduce a visual quality of the 3D scene and does not significantly reduce the efficiency in animating the 3D object. Weights for the morph targets can be derived, e.g., using the model and/or the semantic information, very fast and with high accuracy.

Accordingly, in accordance with a sixth aspect of the present application, a scene rendering apparatus for rendering a scene from a 3D scene description data is configured to derive, from the 3D scene description data first mesh information, moving information and information on a plurality of morph targets. The 3D scene description data comprises the first mesh information, the moving information and the information on the plurality of morph targets and an apparatus for encoding the scene into the 3D scene description data is configured to provide the 3D scene description data with the first mesh information, the moving information and the information on the plurality of morph targets. The first mesh information provides information on a definition of a mesh, e.g., a first mesh, of a movable 3D object. The moving information indicates how to move the mesh. The moving information includes a definition of a skeleton of the movable 3D object. The information on the plurality of morph targets provides information on the morph targets of the plurality of morph targets, wherein each morph target defines a compensating deformation of the first mesh for assuming a respective primitive pose. Additionally, scene description/rendering apparatus is configured to further derive from the 3D scene description an indication of a model to which the information on a plurality of morph targets refers, wherein the model indicates how to form a weighted average of the plurality of morph targets so as to indicate an influence of the first mesh by the skeleton for a freely chosen pose of the movable 3D object, and/or an indication of a semantic information which associates each of the plurality of morph targets with a corresponding joint and discriminates between morph targets associated with one corresponding joint in terms of joint amount, type and/or direction of joint movement. It is especially advantageous that the semantic information does not only associates each of the plurality of morph targets with a corresponding joint, but provides additionally information for which transformation of the respective joint the respective morph target can be used. The transformation of the joint may be indicated by a joint amount, e.g., how strongly the respective joint influences a respective vertex or a level of influence of the respective morph target on the respective joint, or by a joint type, like a ball joint or hinge joint, and/or by a direction of joint movement, like a direction of translation or rotation.

An embodiment is related to a method, wherein the method comprises features described with regard to the sixth aspect. The method is based on the same considerations as the above-described scene rendering apparatus and/or the apparatus for encoding. The method can, by the way, be completed with all features and functionalities, which are also described with regard to the scene rendering apparatus and/or the apparatus for encoding. Functional features described with regard to the scene rendering apparatus and/or the apparatus for encoding may represent steps of the method.

In accordance with a seventh aspect of the present invention, the inventors of the present application realized that one problem encountered when trying to animate/transform a 3D object to which a volumetric scan mesh and a model mesh are associated, stems from the fact that a mapping between the volumetric scan mesh and the model mesh has to be established. According to the seventh aspect of the present application, this difficulty is overcome by perfectly aligning the model mesh to the volumetric scan mesh for establishing the mapping. The inventors found, that it is advantageous to not only use morph targets/pose-blend shapes and/or skeleton/joint transformations but also a global movement, like a displacement and/or a rotation and/or a scaling of the model mesh, to align the model mesh with the volumetric scan mesh. This is based on the idea that morph targets/pose-blend shapes and/or skeleton/joint transformations do only change a pose of the model mesh, i.e. the model mesh is only changed locally, but do not move/transform the model mesh globally in a 3D space. The alignment of the model mesh and the volumetric scan mesh can be improved by transferring/moving the model mesh with the correct pose, i.e. a reference pose, e.g., corresponding to the pose defined by the volumetric scan mesh, to the correct position/orientation, i.e. a reference position, e.g., corresponding to the position/orientation of the 3D object defined by the volumetric scan mesh. For example, the model mesh is transferred to a reference pose using morph targets/pose-blend shapes and/or skeleton/joint transformations and the model mesh in the reference pose is transferred to the reference position using a global movement. The accuracy at the alignment is increased increasing also an accuracy at an establishing of the mapping between the two meshes. This is also advantageous in term of a visual quality of a 3D scene.

Accordingly, in accordance with a seventh aspect of the present application, a scene rendering apparatus for rendering a scene from a 3D scene description data is configured to derive, from the 3D scene description data first mesh information, moving information, second mesh information and correspondence information. The 3D scene description data comprises the first mesh information, the moving information, the second mesh information and the correspondence information and an apparatus for encoding the scene into the 3D scene description data is configured to provide the 3D scene description data with the first mesh information, the moving information, the second mesh information and the correspondence information. The first mesh information provides information on a definition of a mesh, e.g., a first mesh, of a movable 3D object. The moving information indicates how to move the mesh. The moving information includes a definition of a skeleton of the movable 3D object. The second mesh information provides information on a definition of a second mesh of the movable 3D object and the correspondence information defines a correspondence between portions of the first mesh and the second mesh so that the correspondence information enables, e.g. the scene rendering apparatus, to establish a mapping from the first mesh to the second mesh. The scene description/rendering apparatus is configured to further derive from the 3D scene description data a reference pose information on a movement of the first mesh to assume a reference pose. The reference pose information comprises a skeleton movement definition, e.g., from the default pose to the reference pose, and an information on a 3D object global displacement and/or rotation and/or scaling to be applied to the first mesh. The 3D scene description data comprises the reference pose information and an apparatus for encoding the scene into the 3D scene description data is configured to provide the 3D scene description data with the reference pose information. The reference pose information can be used to perform the establishing of the mapping from the first mesh to the second mesh with the first mesh assuming the reference pose.

An embodiment is related to a method, wherein the method comprises features described with regard to seventh aspect. The method is based on the same considerations as the above-described scene rendering apparatus and/or the apparatus for encoding. The method can, by the way, be completed with all features and functionalities, which are also described with regard to the scene rendering apparatus and/or the apparatus for encoding. Functional features described with regard to the scene rendering apparatus and/or the apparatus for encoding may represent steps of the method.

An embodiment is related to a data stream having a picture or a video encoded thereinto using a herein described method for encoding.

An embodiment is related to a computer program having a program code for performing, when running on a computer, a herein described method, when being executed on the computer.

BRIEF DESCRIPTION OF THE DRAWINGS

Embodiments of the present invention will be detailed subsequently referring to the appended drawings, in which:

FIG. 8 shows an embodiment of 3D scene description data indicating whether partial correspondences are to be used;

FIG. 9 shows an embodiment of 3D scene description data indicating correspondence values;

FIG. 11 shows an embodiment of 3D scene description data indicating reference pose information;

FIG. 12 shows an embodiment of 3D scene description data indicating whether weights are present for morph targets;

FIG. 13 shows an embodiment of 3D scene description data indicating weights for morph targets;

FIG. 14 shows an embodiment of 3D scene description data indicating whether weights are present for a subset of morph targets;

FIG. 15 shows an embodiment of 3D scene description data indicating weights for a subset of morph targets;

FIG. 19 shows an embodiment of 3D scene description data indicating a global transformation of an object.

DETAILED DESCRIPTION OF THE INVENTION

Figure 1:
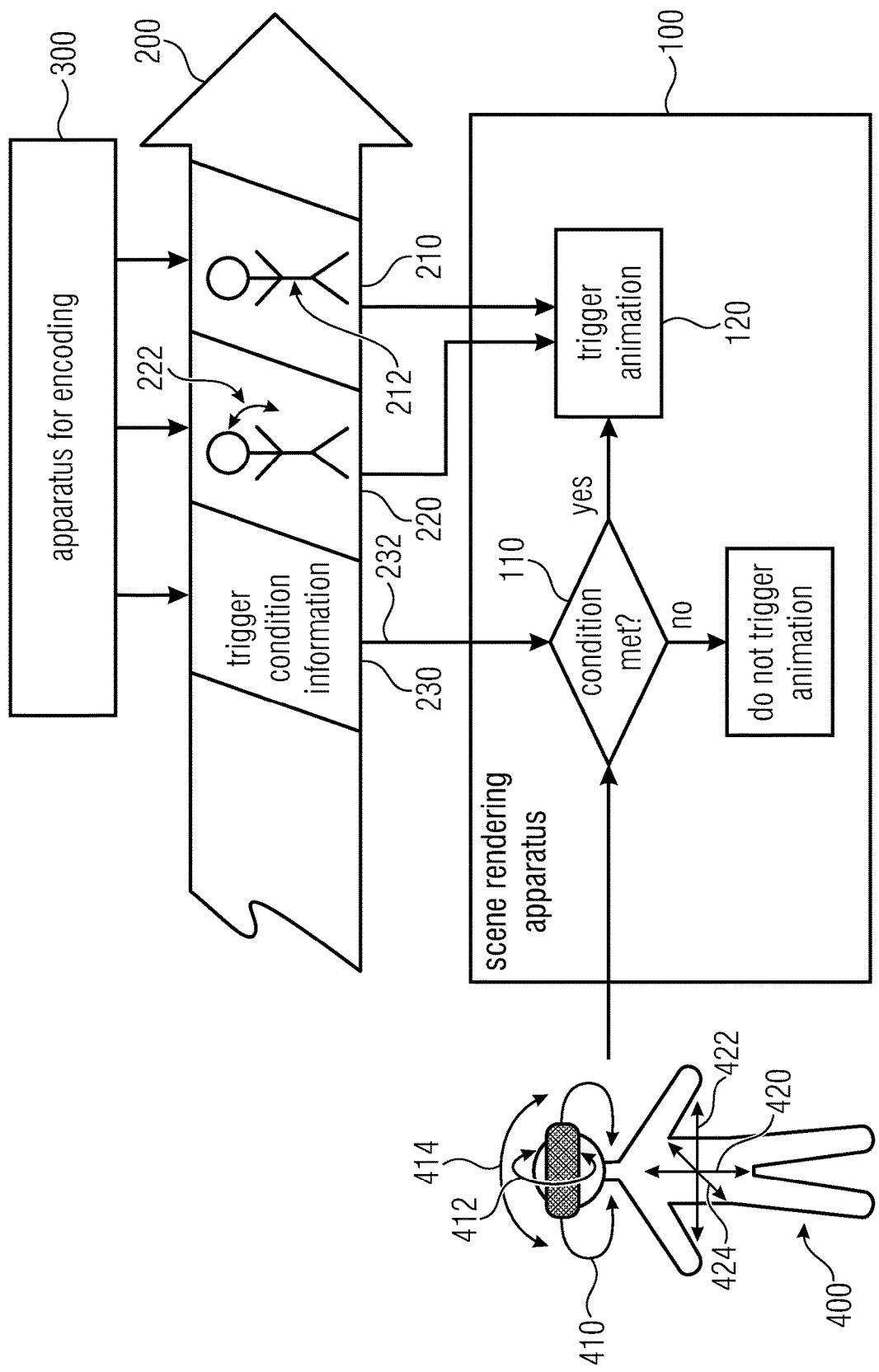
FIG. 1 shows an embodiment related to a triggering of an animation dependent on a position of a viewer of the 3D scene.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

Transformation of 3D objects is particularly useful in some scenarios, e.g. when 6DoF content is streamed to users and some kind of modification of the scene is envisioned. Different ways of transformation of such an object are envisioned. In order to differentiate clearly within this description among two types of transformation the following nomenclature is used. By "animation" pre-defined transformations are meant. For instance, in a scene description document as gITF transformations of objects can be described by the so-called animation attributes that describe the timeline and the particular transformation of an object such as translation, rotation and magnitudes thereof. Examples thereof, can be the model of a person that has predefined transformations of the body, such as jumping, walking in a particular direction, etc. In addition to such pre-defined transformation a 3D engine/renderer can transform an object "freely" given that some information such as skinning information or different pose-blend shapes are provided. The free transformation that is not pre-defined is referred to as interaction since it is not predefined but it might be carried out as a response to some further interaction of the user with the scene, e.g. the viewer is moving and an object follows the user.

Different aspects are covered in this description related to animations/interactivity of 3D objects in the scene.

1. Triggers for Animations

As shown in FIG. 1, an embodiment relates to a scene rendering apparatus 100 for rendering a scene from a 3D scene description data 200. The scene rendering apparatus 100 is configured to derive, from the 3D scene description data 200, first data 210 defining a 3D object 212, second data 220 defining an animation 222 of the 3D object 212, like waving of an arm of the 3D object 212, and trigger condition information 230 defining a condition for a viewing position and/or viewing orientation of a user/viewer 400. An apparatus 300 for encoding the scene into the 3D scene description data 200 is configured to provide the 3D scene description data 200 with the first data 210, the second data 220 and the trigger condition information 230.

The viewer 400 views the scene rendered by the scene rendering apparatus 100. The viewer 400 has six degree of freedom for the viewing position and/or viewing orientation, which are indicated by the arrows around the body of the viewer 400. That means that the viewer 400 can freely choose the viewing position and/or viewing orientation to observe the scene, e.g., to observe virtual reality media. The viewing orientation may be defined as yaw 410, pitch 412 and roll 414. The viewing position may be defined as up-down 420, left-right 422 and forward-backward 424, i.e. along x-, y- and z-dimension. Optionally, the viewer 400 has only three degree of freedom, e.g., only related to the orientation of the head of the viewer 400 or only related to the position of the body of the viewer 400.

The scene rendering apparatus 100 is configured to check 110 whether the trigger condition 232 for the viewing position and/or the viewing orientation is met, e.g., by comparing the trigger condition 232 with the viewing position and/or the viewing orientation of the viewer 400. The scene rendering apparatus 100 is configured to responsive to the condition for the viewing position and/or the viewing orientation being met, trigger 120 the animation 222 of the 3D object 212.

Figure 2:
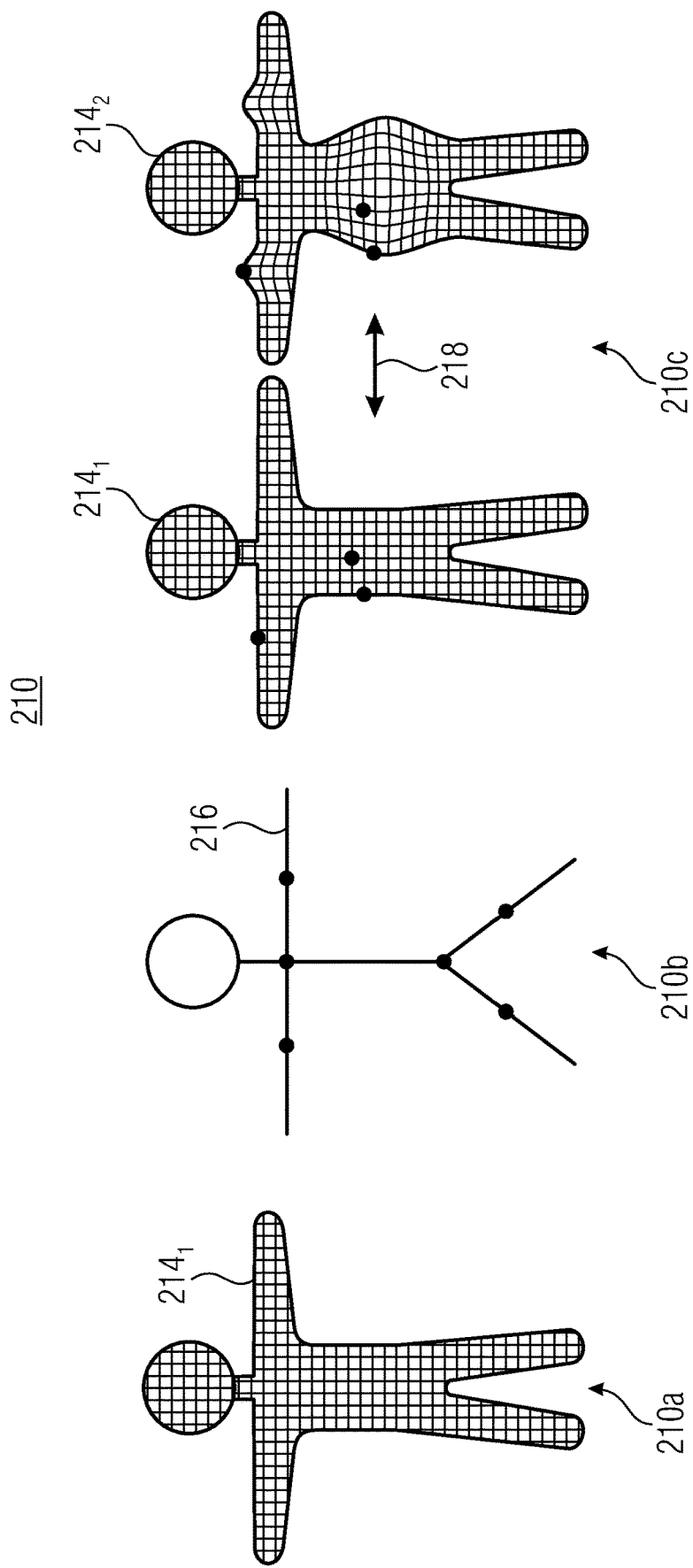
FIG. 2 shows different examples for first data comprised by 3D scene description data.

Exemplarily, FIG. 2 shows different options for the first data 210. The first data 210 may define the 3D object 212 by way of one or two meshes. The first data 210 may comprise information regarding a first mesh $214_1$ of the 3D object 212, as shown as option 210a. Alternatively or additionally to the first mesh $214_1$, as shown as option 210b, the first data 210 may comprise information regarding a skeleton 216 of the 3D object 212. According to a further option 210c, the first data 210 may comprise information regarding the first mesh $214_1$ and information regarding a second mesh $214_2$ and correspondence information 218. For the mesh definition, a list of vertex positions and/or a definition of faces formed by the vertices, at a default pose, such as a T pose, may be used. The correspondence information 218 may indicate for each vertex position and/or face formed by the vertices of the first mesh $214_1$ a corresponding vertex position and/or face formed by the vertices of the second mesh $214_2$. Optionally, the first data 210 may comprise additionally to the first mesh $214_1$ and the second mesh $214_2$ the information regarding the skeleton 216 of the 3D object 212.

The second data 220 may define the animation 222 of the 3D object 212 by way of skeleton movement. For example, the scene rendering apparatus 100 is configured to derive from the first data 210 mesh information on a definition of a mesh $214_1$ and/or $214_2$ of the 3D object and derive from the second data 220 a definition of a movement of the skeleton 216 of the 3D object 212, e.g., via rotation and/or translation of joints/vertices. The skeleton 216 of the 3D object may be predefined, so that it is not necessary to also derive same from the first data 210. Otherwise, the scene rendering apparatus 100 is configured to further derive from the first data 210 information on a definition of the skeleton 216 of the 3D object 212.

Animations 222 offered in a scene, e.g. glTF file, can be either freely triggered (when the user 400 wants to, e.g., pressing a button) or one could imagine cases where they are triggered 120 based on some artistic intentions (e.g., at a particular media playback time or when the user 400 is located at or views at a particular position, i.e. dependent on the viewing position and/or the viewing orientation).

Means for applying animations 222 freely triggered are well known and are broadly applied. Similarly, time-based triggering of animations 222 are also known and can be integrated into glTF by linking a track that contains samples that dictate when to trigger an animation 222.

However, non-timed animations 222 that are conditioned to a particular position or orientation require some glTF extension. In one embodiment, the animations 222 in the scene description file 200 (e.g., glTF) are extended to included syntax, i.e. the trigger condition information 230, that indicates what is the position (e.g., x,y,z) and/or viewing orientation (e.g., yaw, pitch, roll) that is used for triggering 120 such an animation 222. Note that the position and/or viewing orientation could also indicate a range that includes any position or orientation in that range is used for triggering 120 the animation 222. The trigger condition information 230 may comprise a range of positions and/or a range of viewing orientations as the condition 232 and the scene rendering apparatus 100 is configured to check 110 whether a user's position is within the range of positions and/or whether a user's orientation is within the range of viewing orientations.

Figure 3:
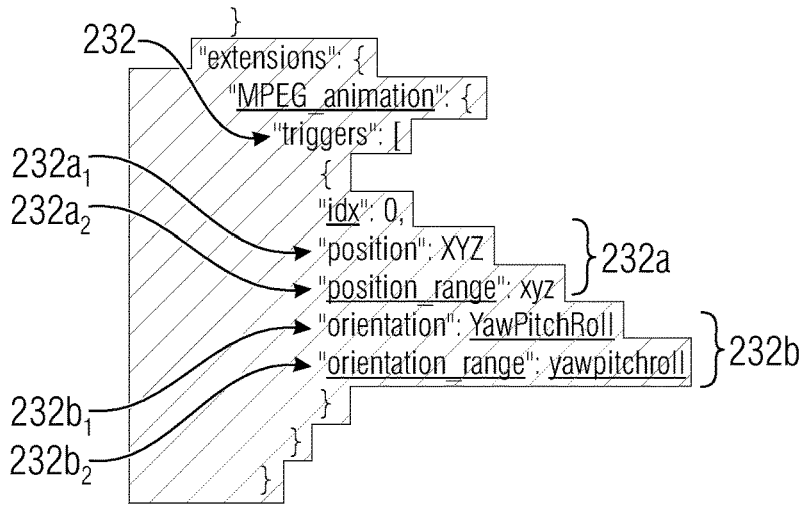
FIG. 3 shows an embodiment of 3D scene description data comprising a trigger condition information.

In the example shown in FIG. 3 two parameters per position 232a are given, the position $232a_1$ and range $232a2$ but a minX, minY, minZ, maxX, maxY, maxZ could be provided alternatively. The same applies to the orientations 232b, see $232b_1$ and $232b_2$. Also, it is important to notice that the roll parameter 414 does not really influence on the viewing orientation but, it only indicates the tilting of the viewers head. Therefore, the viewing orientation 232b could also be represented only with yaw 410 and pitch 412 or even just one component thereof such as yaw 410 or pitch 412 alone.

2. Constrained Transformability

Since animations 222 are pre-defined and the particular transformation of objects 212 are known beforehand, the described transformations are provided so that the result is visibly acceptable and of a good quality. However, when it comes to interactions, to what extent an object 212 can be freely transformed and lead to a good/acceptable visual quality, depends on the accuracy and additional information that is provided to be able to efficiently transform a given object 212.

Figure 4:
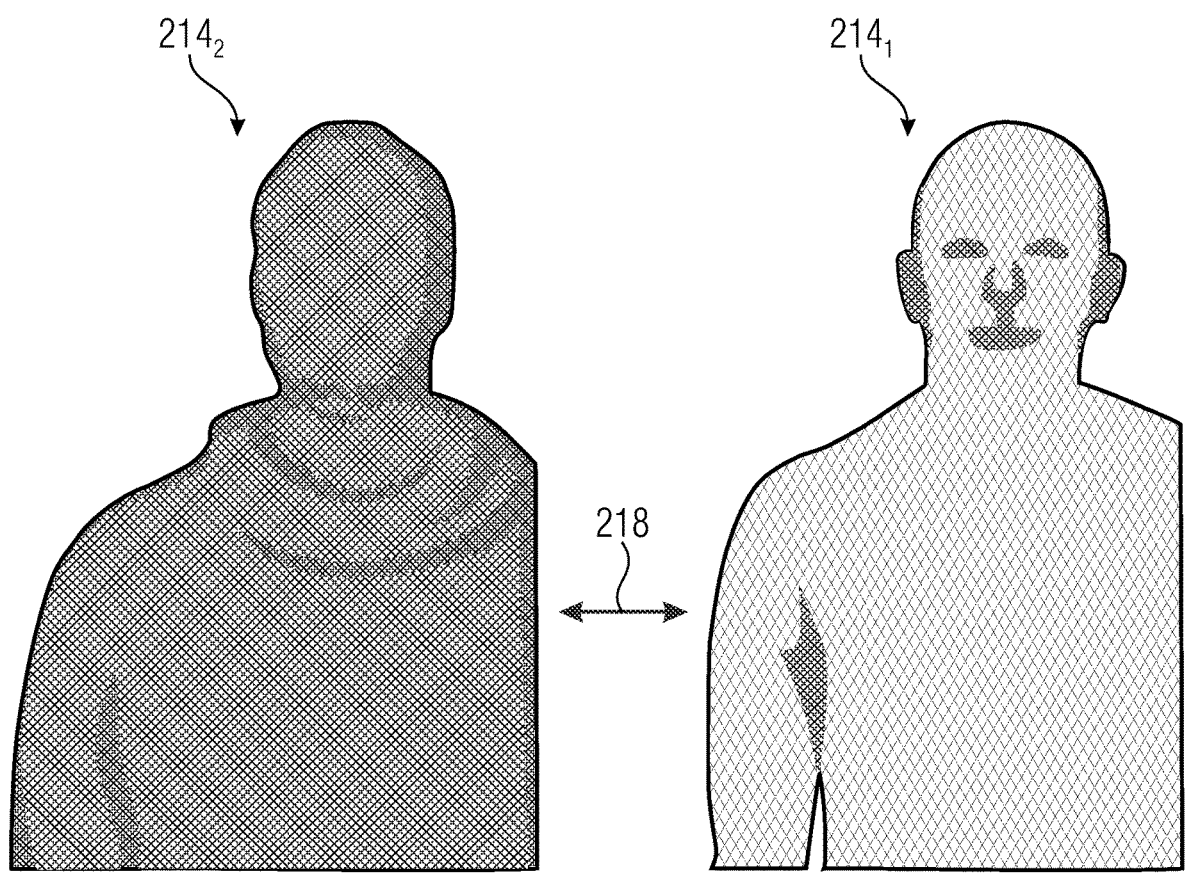
FIG. 4 shows exemplarily a first mesh and a second mesh.

For instance, capturing systems may produce a volumetric scan $214_2$ of a particular object that has some parts occluded (e.g., a body of a person with lowered arms occluding sides of the torso, see FIG. 4). Therefore, the transformation of an object due to interaction needs to be limited to affect parts of the body that when transformed do not lead to a visually unpleasant result (e.g., in the example shown in FIG. 4, raising arms should not be allowed as the occluded content of the body (torso sides) is not captured by the model).

Note also that a way of allowing transformation of a volumetric video, e.g., volumetric scans $214_2$, of an object 112 is by means of providing an animatable model $214_1$ that has enough information to be transformed (e.g. a human body model) and a volumetric scan $214_2$ alongside with correspondence information 218 that "maps" the vertices of both the model $214_1$ and the volumetric scan $214_2$. This solves the problem that the volumetric video might have a changing topology (e.g. number of vertices of the mesh $214_2$) that would require resending the information that allows it to be transform at every topology change. By using a model mesh $214_1$ that has a static topology, such information is sent only once. Mesh correspondences 218 are established as a means to transfer either information or transformations from the surface of a first mesh (e.g. a volumetric capture scan mesh $214_2$) onto a second mesh's surface (e.g. from an animatable model mesh $214_1$). FIG. 4 shows an example of a first scan mesh $214_2$ on the left-hand side and a second model mesh $214_1$ on the right-hand side.

Although the model $214_1$ might be fully animatable, there might be some issues when applying such a transformation to the volumetric scan $214_2$, e.g. as aforementioned due to occlusions in the underlying volumetric scans $214_2$ (e.g. armpit on the left-hand side of FIG. 4). Further issues are unnaturally-seeming geometry artefacts when applying an animation 222 to a scan mesh $214_2$ that was in a highly different pose than what is subject of the animation 222 or clothing on a scan mesh $214_2$ should be excluded from the animation 222 (e.g. collar on the left-hand side of FIG. 4).

However; it might still be viable to animate a part of volumetric scan mesh $214_2$, e.g. enabling transformation for the fingers for a human body with lowered arms might be ok, i.e. to spatially restrict the animation 222. In an embodiment, correspondence values 218 are transmitted only for the animatable parts, or parts of the object 212 for which animation 222 is allowed, are provided.

2.1. Constrained Joints/Pose-Blend Shapes

Figures 5, 6:
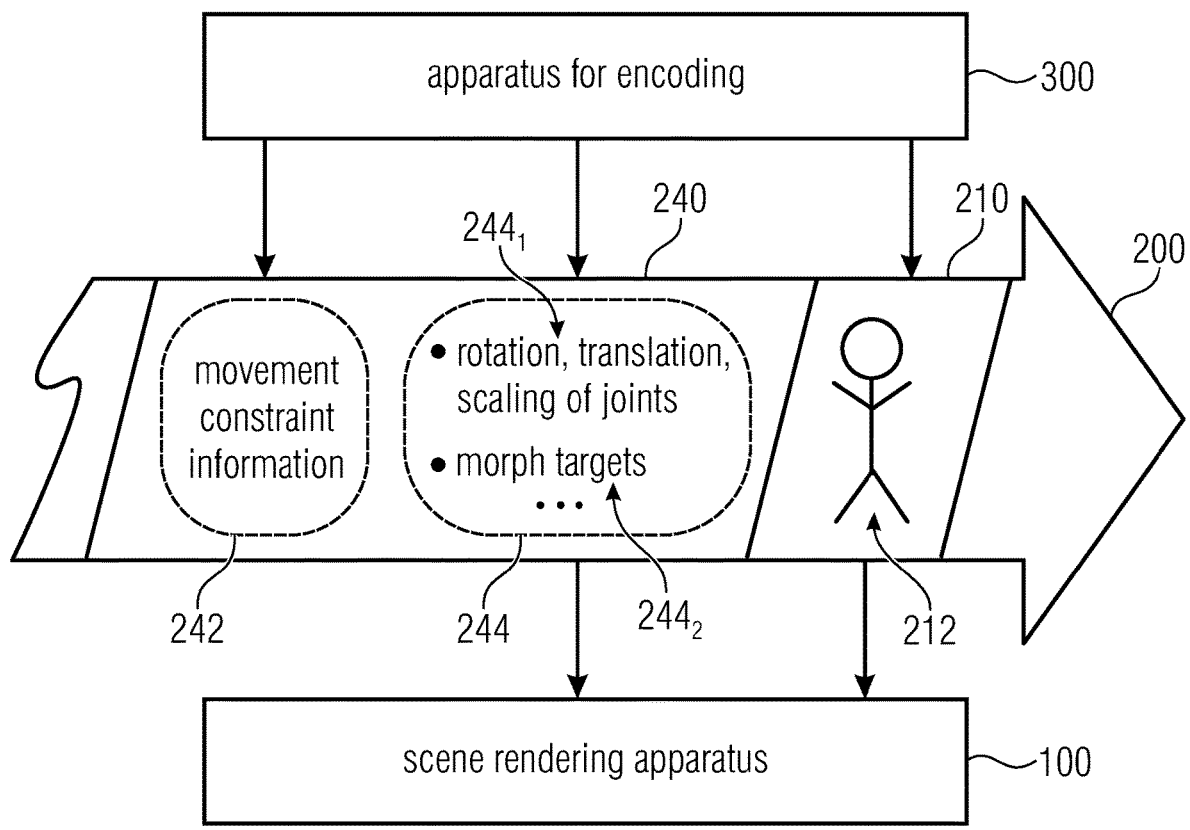
FIG. 5 shows an embodiment related to defining constraints for a movability of a 3D object.
FIG. 6 shows an embodiment of 3D scene description data comprising information of constraints for a movability of a 3D object.

FIG. 5 shows an embodiment, of a scene rendering apparatus 100 for rendering a scene from a 3D scene description data 200. The scene rendering apparatus 100 is configured to derive, from the 3D scene description data 200, first data 210 defining a movable 3D object 212 and second data 240 defining a movability 244 of the movable 3D object 212 and a movement constraint information 242 which defines constraints for the movability 244 of the movable 3D object 212.

The scene rendering apparatus 100, for example, is configured to derive from the 3D scene description data 200 the second data 240 and from the second data 240 the movement constraint information 242, if the second data 240 defines the movement constraint information 242. Alternatively, the second data 240 defines only the movability 244 and the 3D scene description data 200 may comprise the movement constraint information 242 separately and the scene rendering apparatus 100 may be configured to derive from the 3D scene description data 200 the second data 240 and the movement constraint information 242.

The first data may define the 3D object 212 as described with regard to FIG. 1 and/or FIG. 2.

The second data 240 may define the movability 244 of the movable 3D object 212 by defining a rotation, a translation and/or a scaling $244_1$ for joints of a skeleton of the movable 3D object 212, e.g. defining a plurality of animations for the 3D object 212. Additionally, or alternatively, the second data 240 may define the movability 244 of the movable 3D object 212 by defining morph targets/pose-blend shapes $244_2$ for the 3D object 212.

The 3D scene description data 200 may define a default movement, e.g., a director's cut movement or movement without user interaction, of the movable 3D object 212, and the movement constraint information 242 may define the constraints for the movability 244 of the movable object 212 relative to poses of the 3D object 212 defined by the default movement.

Since not all parts can be animated some information, i.e. the movement constraint information 242, needs to be provided so that the player, i.e. the scene rendering apparatus 100, showing the animatable and/or transformable 3D object 112, only is able to modify 244$_1$/244$_2$ the animatable parts. Note that this information 242 could change over time, as for instance the volumetric video 214$_2$ that is captured, may have different occluded parts over time.

Animations may involve modifying joints, applying transformation/rotation 244$_1$ to some particular joints of the rigged object 212 (represented as a skeleton 216) and applying morph-targets 244$_2$ or pose-blend shapes 244$_2$ (set of offset vertices of the 3D object mesh 214$_2$) or a combination thereof. Ways of restricting the possible movements are listed in the following.

Sub-setting pose-blend shapes
Activating pose-blend shapes
Joint animation allowance/constraint For example, the movement constraint information 242 may indicate a subset of movability options 244 of the plurality of movability options 244 provided by the second data 240, wherein only the subset of the movability options 244 can be applied to the 3D object 212 or vice versa wherein only the subset of the movability options 244 cannot be applied to the 3D object 212. The subset of movability options 244 may indicate some modifications 244$_1$ of joints and/or some morph targets 244$_1$. In other words, the movement constraint information 242 may indicate all allowable movements/modifications of the 3D object 212 out of the possible movements/modifications of the 3D object 212 defined by the movability 244.

As pointed out some pose-blend shapes 244$_2$ may correspond to movements and user poses that are problematic to render as indicated above. In one embodiment, signalling, i.e. the movement constraint information 242, is provided that indicates which pose-blend shapes 244$_2$ can be safely used, either by providing sub-sets of the provided pose-blend shapes (morph targets) 244$_2$ or activating/de-activating pose-blend shapes 244$_2$. Thus, the player 100 knows which ones can be used without leading to any visual problem. Note that this property may change over time and some blend-shapes 244$_2$ could be valuable for a particular time but should not be used for another particular time. Therefore, the envisioned signalling 242 can change over time.

In another embodiment, signalling 242 is provided that indicates the space of freedom for a joint to be modified. Such limitations include rotation and/or translation and/or scaling 244$_1$.

The described information 242 can be added directly to glTF as an extension, e.g. a property of morph-targets or joints, respectively.

In another alternative, the information 242 is provided by a metadata-track. The track might contain samples that change over time and each sample provides the properties of the morph-targets, joints for that sample onwards until the next sample. An example is shown in FIG. 6 for providing joint information regarding translation/rotation limits (LimitationTransformationSample).

According to an embodiment, the scene rendering apparatus 100 is configured to derive the movement constraint information 242 from an extension portion of a section of a glTF file of the 3D scene description data 200, the section relating to the movable object 212, or a meta data track of the glTF file.

The movement constraint information 242 may indicate properties of the movability options 244 provided by the second data 240, like limitations of the properties. For example, the movement constraint information 242 may indicate to what extent transformations 244$_1$, e.g., rotation, translation and/or a scaling of joints of the skeleton of the movable 3D object 212 and/or morph targets/pose-blend shapes 244$_2$, can be applied to the 3D object 212.

In the example in FIG. 6 maximum values are shown as a delta to the original pose (when no transformation is applied). Alternatively, different maximum values could be indicated for positive and negative changes to joint rotation or position (translation) 244$_1$ or also a range could be provided for rotation and translation 244$_1$ indicating how much a joint can be transformed 244$_1$ and/or even an additional flag that tells whether a joint can be transformed 244$_1$ at all or not could be used, only providing the limits when the joint can be transformed 244$_1$.

The constraints for the movability 244 of the movable 3D object 212 are to be obeyed in moving the movable 3D object 112 according to user interaction. For example, a user/viewer 400 may select a movement for the movable 3D object 212 out of the movability options indicated by the second data 240 and the scene rendering apparatus 100 is configured to apply the selected movement to the movable 3D object 212 obeying the constraints defined by the movement constraint information 242.

According to an embodiment the second data 240 may comprise information on a plurality of morph targets 244$_2$, each morph target 244$_2$ defining a compensating deformation of the first mesh 214$_1$ for assuming a respective primitive pose. The movability 244 of the movable object may be defined by the information on the plurality of morph targets 244$_2$. The movement constraint information 242 may correspond to an indication of a subset of morph targets 244$_2$ out of the plurality of morph targets 244$_2$, a usage of which is available in moving the movable object 212 during a time sub-period, while any morph targets 244$_2$ not contained in the subset is unavailable, wherein a persistence of the definition of the mesh 214$_1$ of the movable object 212, the definition of the skeleton 216 of the movable 3D object 212 and the information on the plurality morph targets 244$_2$ exceed the time sub-period.

Additionally, or alternatively, updates on the indication of the subset of morph targets 244$_2$ may be provided. The updates change the indication so that the subset of morph targets 244$_2$ temporally changes during the persistence of the definition of the mesh 214$_1$ of the movable object 212 and the definition of the skeleton 216 of the 3D object 212. This enables to update the movement constraint information 242.

Note that pose-blend shapes 244$_2$ (the term as used herein, e.g., as an alternative for morph targets) denote offsets of the vertices of the first mesh 214$_1$ to be applied at the T-pose that do not correspond to a pose by themselves but deform the T-pose so that when transforming the target pose of the skeleton 216 to a different pose (other than the T-pose) and applying skinning, it looks good. Especially, the plurality of morph targets 244$_2$ is for primitive poses such as lowering one arm, bending the arm, turning the head, and so on. Thus, in other words, the term morph-targets 244$_2$ is used to denote "a deformation" of the first mesh 214$_1$ at the T-pose to counter/remove "undesired" deformations when performing skinning (skinning transformation) at a particular pose different than the T-pose. The "second mesh" $214_2$ mentioned herein, actually does not have pose-blend shapes $244_2$ or morph targets $244_2$ applied to it. The pose-blend shapes $244_2$ are applied to the first mesh $214_1$ to reflect error free the first mesh $214_1$ at the same pose as the second mesh $214_2$.

According to an embodiment the second data 240 may comprise information on a plurality of morph targets $244_2$ associated with the movable object 212 for a time period. Additionally, an indication of a subset of morph targets $244_2$ out of the plurality of morph targets $244_2$ may be provided. The movement constraint information 242 may correspond to the indication of the subset of morph targets $244_2$. The subset of morph targets $244_2$ can be used for moving the movable object 212 during a time sub-period within the time period, while any morph target $244_2$ not contained in the subset cannot be used for moving the movable object 212 during the time period. Additionally, or alternatively, updates on the indication of the subset of morph targets can be provided, wherein the updates change the indication so that the set of morph targets $244_2$ temporally changes.

According to an embodiment the above described updates may be provided so that the subset changes in consecutive time sub-periods.

As described above for morph targets $244_2$ similar features regarding constraints may apply to skeleton transformations $244_1$, as will be described in the following.

The second data 240 may comprise joint information, e.g., information on transformations $244_1$, on joints of the skeleton 216 or of the movable object 212. Additionally, joint constraint information may be provided. The movement constraint information 242 may correspond to the joint constraint information. The joint constraint information indicates a restriction of a space of freedom of the joints and/or indicates a selection out of the joints which are immobilized. The joint constraint information, for example, restricts the space of freedom of the joints by way of restricting an angular movability range of the joints. Additionally, or alternatively, the joint constraint information restricts the space of freedom of the joints by way of restricting an translational movability range of the joints, e.g., a translation compared to a previous position of the joint.

According to an embodiments updates of the joint constraint information may be provided, so that the restriction of the space of freedom of the joints and/or the selection out of the joints which are immobilized temporally changes, e.g., in consecutive time sub-periods.

2.2. Partial Correspondence (WM)

Figure 7:
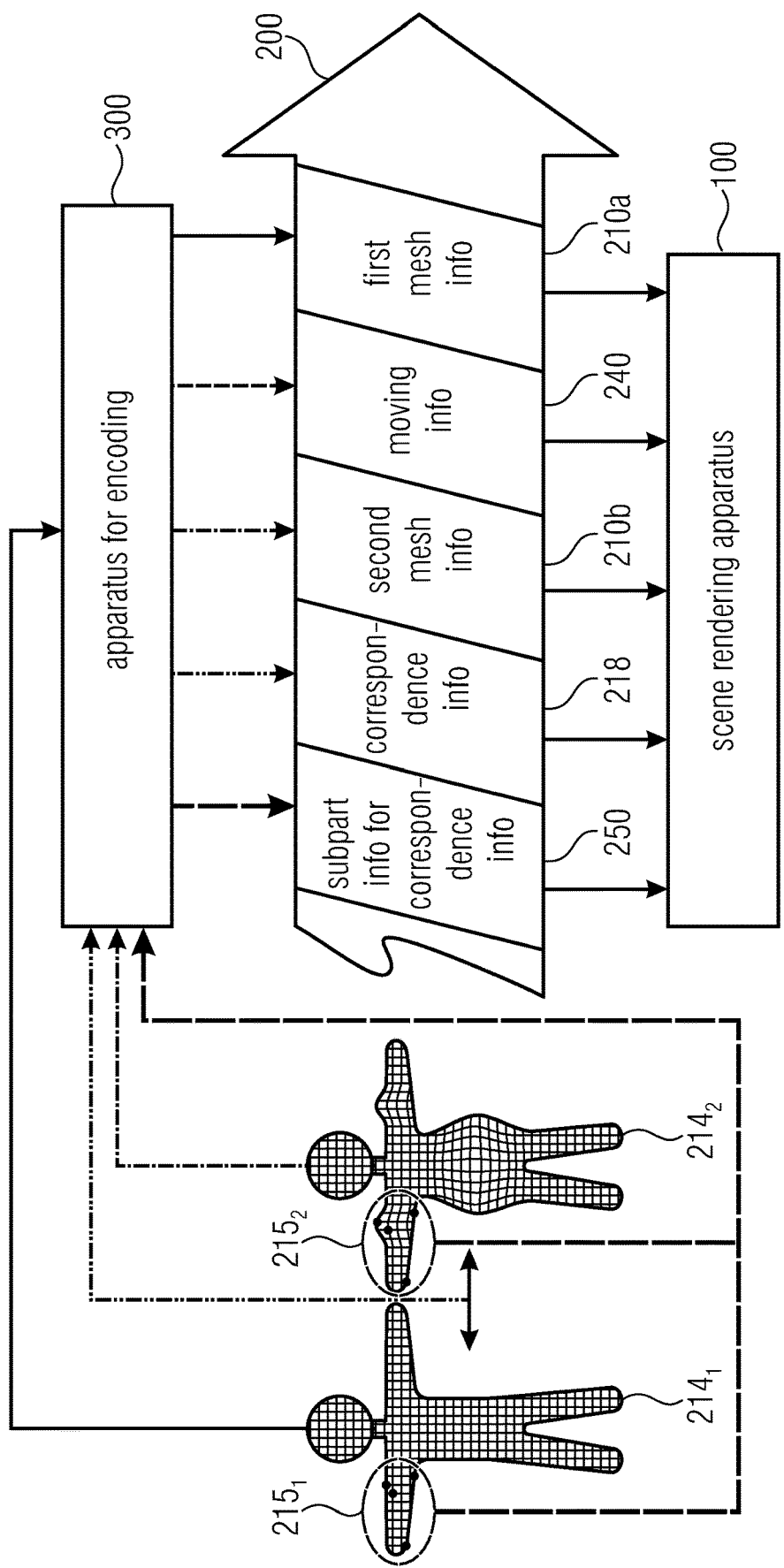
FIG. 7 shows an embodiment related to partial correspondences.

FIG. 7 shows an embodiment of a scene rendering apparatus 100 for rendering a scene from a 3D scene description data 200. The Scene rendering apparatus 100 is configured to derive, from the 3D scene description data 200, first mesh information 210a, moving information 240, second mesh information 210b and correspondence information 218. An apparatus 300 for encoding the scene into the 3D scene description data 200 is configured to provide the 3D scene description data 200 with the first mesh information 210a, the moving information 240, the second mesh information 210b and the correspondence information 218.

The first mesh information 210a provides information on a definition of a first mesh $214_1$ of a movable object 212 and the second mesh information 210b provides information on a definition of a second mesh $214_2$ of the movable object 212. The first mesh $214_1$ and the second mesh $214_2$ are, for instance, defined by a respective list of vertex positions and/or a respective definition of faces formed by the respective vertices. The first mesh $214_1$ may define the movable 3D object 212 in a T pose, as shown in FIG. 7. The first mesh $214_1$ may be regarded as defining a model hull of the 3D object 212. The second mesh $214_2$ may stem from a volumetric scan. The second mesh $214_2$ may be regarded as defining the actual hull of the 3D object 212.

According to an embodiment the first mesh information 210a and the second mesh information 210b may be comprised by the first data 210 described with regard to FIGS. 1, 2 and 5.

The moving information 240 indicates how to move, e.g. in response to user interaction as described with regard to FIG. 1, or via signaled default movement instructions, the first mesh $214_1$. The moving information 240 may, for example, correspond to the second data 220 described with regard to FIG. 1. The moving information 240 may indicate a skeleton movement and/or morph targets, e.g., to modify the first mesh $214_1$ and move the 3D object 212. For example, the moving information 240 may indicate one or more skeleton movements $244_1$ and/or morph targets $244_2$ out of the movability options 244 described with regard to FIG. 5. Optionally, the movement indicated by the moving information 240 has to obey constraints indicated by movement constraint information 242, as described with regard to FIG. 5.

The correspondence information 218 defines a correspondence between one or more portions of the first mesh $214_1$ and one or more corresponding portions of the second mesh $214_2$. In FIG. 7 exemplarily some portions are highlighted by dots in both meshes. In FIG. 7 the portions correspond to vertices of the respective mesh, but it is alternatively possible, that the portions correspond to faces of the respective mesh. The correspondence information 218 enables to establish a mapping from the first mesh $214_1$ to the second mesh $214_2$ or vice versa.

Note that, accordingly, the correspondence is a kind of concordance mapping linking vertices or faces of a subpart $215_1$ associated with the first mesh $214_1$ to vertices or faces of a corresponding subpart $215_2$ associated with the second mesh $214_2$. FIG. 7 shows exemplarily a vertex-vertex correspondence, but it is also possible that the correspondence information 218 indicates a vertex-face correspondence or a face-vertex correspondence or a face-face correspondence. The correspondence information 218 indicates one-to-one correspondences between the vertices or faces associated with the first mesh $214_1$ to the vertices or faces associated with the second mesh $214_2$, e.g., an injective or bijective mapping between the portions of the two meshes $214_1$ and $214_2$.

The scene rendering apparatus 100 may be configured to establish the mapping which yields, for example, the relative location of a vertex of the first mesh $214_1$ to the corresponding vertex of the second mesh $214_2$ at the vertex-vertex correspondence, the relative location of a vertex of the first mesh $214_1$ to the corresponding face of the second mesh $214_2$ at the vertex-face correspondence, the relative location of a face of the first mesh $214_1$ to the corresponding vertex of the second mesh $214_2$ at the face-vertex correspondence or the relative location of a face of the first mesh $214_1$ to the corresponding face of the second mesh $214_2$ at the face-face correspondence. A set of vertices or faces associated with the subpart $215_1$ of the first mesh $214_1$ may be mapped in a bijective way to a set vertices or faces associated with the corresponding subpart $215_2$ of the second mesh $214_2$.

The scene rendering apparatus 100 is further configured to derive from the 3D scene description data 200 an information 250 on which subpart $215_1$ of the first mesh $214_1$ and/or which subpart $215_2$ of the second mesh $214_2$ the correspondence information 218 relates to. In the embodiment, shown in FIG. 7, for example, the information 250 indicates that the correspondence information 218 relates to vertices and/or faces associated with an arm of the movable 3D object 212. A subpart may relate to a part of the object, like a head, an arm, a leg, the torso, a hand, a foot, etc. For example, the first $214_1$ and the second $214_2$ mesh may each comprise a plurality of subparts 215, wherein each subpart 215 comprises a set of portions, i.e. set of vertices and/or a set of faces. The subparts 215 can be indicated by a respective index.

As described above, when a model is provided, e.g., by the first mesh information 210a, along with information to be animatable/transformable, i.e. the moving information 240, and an additional volumetric scan video, e.g., provided by the second mesh information 210b, correspondences 218 are also provided to transfer the transformations in the model, i.e., the first mesh $214_1$, to the volumetric video, i.e. the second mesh $214_2$. Such correspondences 218, for example, are provided per volumetric scan vertex. However, when not all parts 215 of the object 212 can be transformed such a solution is not efficient as correspondences 218 are provided for vertices that are not modified. In another embodiment, only correspondences 218 are provided for some of the vertices of the volumetric scan $214_2$, and are referred to as partial correspondences 218; for use cases where we do not need information for the complete surface of the scan mesh $214_2$.

In the case of animating human model meshes, i.e. the first mesh $214_1$, and captured actors scan meshes, i.e. the second mesh $214_2$, we may only want to have the hands, or only the face to be animatable, while the rest of the scan mesh $214_2$ is kept altered from the recorded/stored position, i.e. is not animated.

In the case of partial correspondence 218 coverage, the amount of data transferred by providing correspondences 218 is reduced and data is provided as a tuple of (primitive index of first scan mesh $214_2$, corresponding primitive index of second model mesh $214_2$). It should be noted that this information represents a generic mapping between the two meshes $214_1/214_2$ regardless of underlying used primitives (vertices or faces, or another type of geometric primitive (points, lines, whatever). In a typical case, the primitive index of the first scan mesh $214_2$ corresponds to the index identifying a vertex, and the second primitive index of the model mesh $214_1$ corresponds to a face of the model mesh $214_1$. However, other options could be envisioned, in which signalling needs to be provided to identify what is the primitive to which the index applies.

As a further aspect of this invention, when transmitting correspondences 218, it may be announced whether a full correspondence list with single values is transferred, or whether a partial correspondence list with tuple-indexed values is transferred via the 3D scene description data 200. An example is shown in FIG. 8.

The sample entry would describe the format of the samples.

In this example correspondence_type equal to 0 corresponds to correspondence values provided for all vertices of the 3D object, and equal to 1 corresponds to partial correspondences 218, i.e. only for some vertices. In other words, the 3D scene description data 200 can comprise an indication whether the correspondence information 218 defines the correspondence between subparts $215_1/215_2$ of the first $214_1$ and second $214_2$ meshes for the first $214_1$ and second $214_2$ meshes completely, or whether the correspondence information 218 defines the correspondence between subparts $215_1/215_2$ of the first $214_1$ and second $214_2$ meshes only partially. The subpart information 250 may only be provided by the 3D scene description data 200 in case it is indicated that partial correspondences 218 are provided.

Then the samples are provided in the track that contains the actual values for each time instant, see FIG. 9, where vert_idx[i] indicates the vertex to which the correspondences[i] applies.

When using partial correspondence maps, e.g., defined by the correspondence information 218, for an animation, e.g., a movement indicated by the moving information 240, of the subset $215_1$ of the surface of the mesh $214_1$, the content creator, e.g., the scene rendering apparatus 100, needs to ensure that the area affected by animating the model mesh $214_1$ is no larger than the surface of the scan mesh $214_2$ covered by the partial correspondences 218. Otherwise, there will appear artefacts at the borders of changes in the scan mesh $214_2$ that will not be propagated due to missing correspondences. In other words, partial correspondences 218 has to be accompanied by information describing permitted animations/transformations as aforementioned that do not result is changes outside the area scan mesh $214_2$ that is covered by the correspondences 218.

According to an embodiment, the scene rendering apparatus is configured to perform the deriving from the 3D scene description data 200 the information 250 on which subpart $215_1$ of the first mesh $214_1$ and/or which subpart $215_2$ of the second mesh $214_1$ the correspondence information 218 relates by deriving, for each of the portions of the first mesh $214_1$, an index indexing the respective subpart $215_1$ out of subparts of the first mesh $214_1$ with deriving a correspondence, e.g., a tuple of (portion of the first mesh $214_1$, portion of the second mesh $214_2$), relating to the second mesh $214_2$ for the respective portion, or deriving, for each of the portions of the second mesh $214_2$, an index indexing the respective subpart $215_2$ out of subparts of the second mesh $214_2$ with deriving a correspondence, e.g., a tuple of (portion of the second mesh $214_2$, portion of the first mesh $214_1$), relating to the first mesh $214_1$ for the respective portion.

According to an embodiment the scene rendering apparatus 100 is configured to, if the indication indicates that the correspondence information 218 defines the correspondence between portions of the first $214_1$ and second $214_2$ meshes for the first $214_1$ and second $214_2$ meshes completely, derive the correspondence information 218 as a list of correspondences to the second mesh $214_2$, sequentially related to subparts 215 of the first mesh $214_1$ according to an order defined among the subparts 215 by the first mesh information 210a or a list of correspondences to the first mesh $214_1$, sequentially related to portions of the second mesh $214_2$ according to an order defined among the subparts 215 by the first mesh information 210a.

According to an embodiment, the correspondences can be derived by the scene rendering apparatus 100 from a section of the 3D scene description data 200 which relates to the first mesh $214_1$.

3. Mapping Aspects to Animatable/Transformable 3D Volumetric Objects

The concepts described in the following with regard to FIG. 10 to FIG. 19 are all applicable for establishing a mapping between two meshes, i.e. a first mesh $214_1$ and a second mesh $214_2$, and for transferring a transformation from one of the two meshes to the other one. The first mesh $214_1$ may be a shadow mesh or a model mesh and the second mesh $214_2$ may be a dependent mesh or a volumetric scan mesh. The dependent mesh $214_2$ can be transformed/animated by relying on the shadow mesh $214_1$. For example, correspondence information 218 associated with the dependent mesh $214_2$ links the dependent mesh $214_2$ and the shadow mesh $214_1$. The shadow mesh $214_1$ may be transformed/animated and the mapping may be used to transfer this transformation/animation to the dependent mesh $214_2$. Hence, the shadow mesh $214_1$ is present in the 3D scene description data 200 to assist in achieving the ability to apply a transformation/animation onto the dependent mesh $214_2$.

Figure 10:
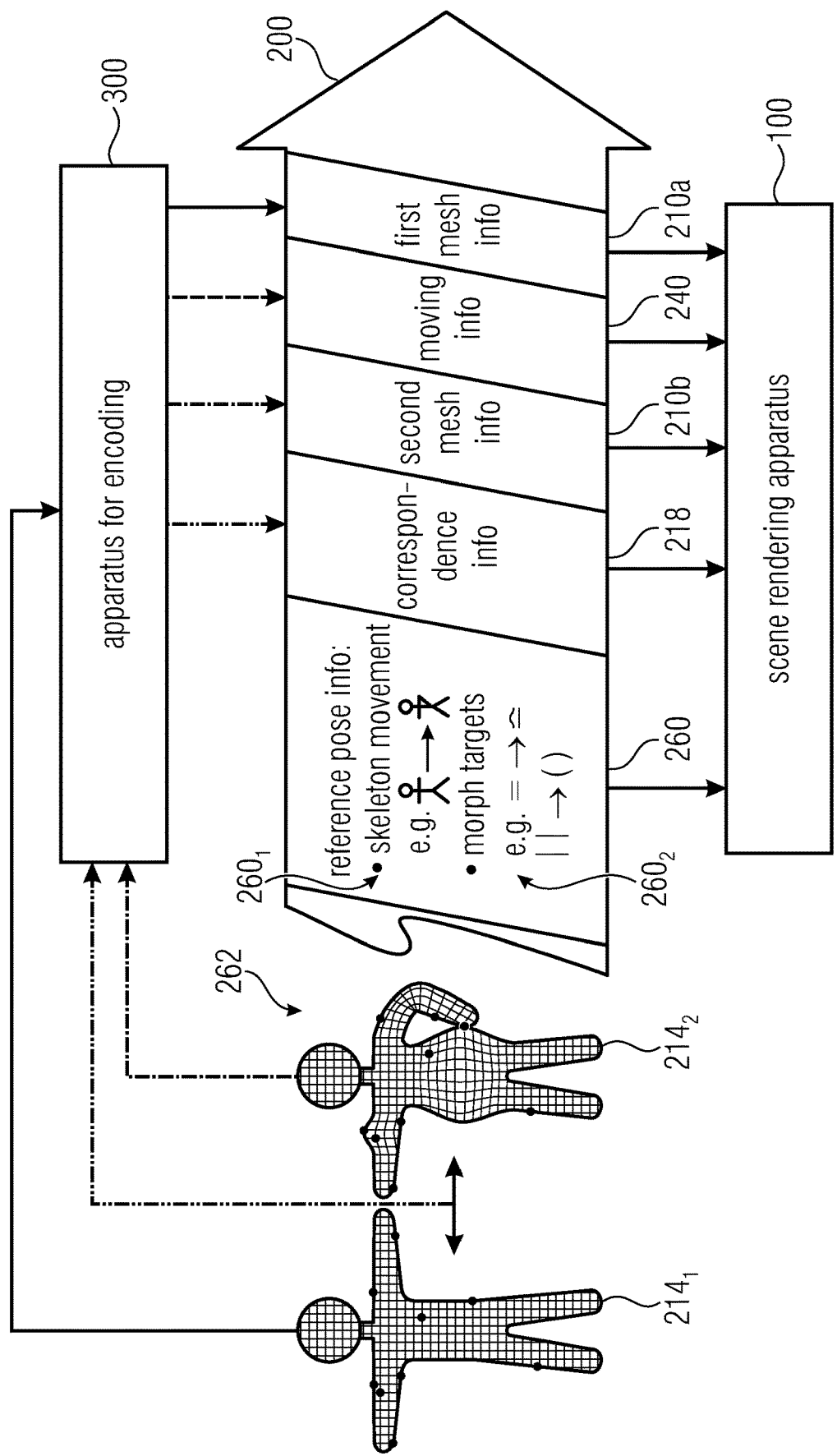
FIG. 10 shows an embodiment related to a mapping of two meshes using reference pose information.

FIG. 10 shows a scene rendering apparatus 100 for rendering a scene from a 3D scene description data 200, configured to derive, from the 3D scene description data, first mesh information 210a, moving information 240 including a definition of a skeleton 216 of the movable 3D object 212, e.g., skeleton definition plus skinning transform, second mesh information 210b and correspondence information 218. These information 210a, 210b, 218 and 240 can be as defined or described with regard to FIG. 7. The correspondence information 218 defines a correspondence between portions of the first mesh $214_1$ and the second mesh $214_2$ so that the correspondence information 218 enables to establish a mapping from the first mesh $214_1$ to the second mesh $214_2$. In FIG. 10 only some corresponding portions between the two meshes $214_1$ and $214_2$ are exemplarily highlighted by dots. In this case the corresponding portions relate to vertices. It should be clear that the correspondence information 218 may provide correspondences for a set vertices or faces of the first $214_1$ and second $214_2$ meshes, wherein it is possible that correspondences for the whole first $214_1$ mesh and/or second $214_2$ mesh are provided.

Additionally, the scene description/rendering apparatus 100 is configured to derive from the 3D scene description a reference pose information 260 on a movement of the first mesh $214_1$ to assume a reference pose 262. The reference pose information 260 comprises a skeleton movement definition $260_1$, e.g., from the default pose to the reference pose 262, and an indication of a weighted average of morph targets $260_2$. The skeleton movement definition $260_1$ and the weighted average of morph targets $260_2$ can be indicated individually in the 3D scene description data 200. In FIG. 10, for example, the skeleton movement definition $260_1$ indicates a bending of an arm of the object 212, e.g., a movement from the T-pose to the pose 262 with the bended arm. The indication of the weighted average of morph targets $260_2$, for example, defines weights to be applied to the morph targets of the first mesh $214_1$, so that a compensating deformation of the first mesh $214_1$ for assuming a respective primitive pose is defined. A primitive pose represents, e.g. the bending of the arm. The weighted average of morph targets $260_2$ is indicated, so that the 3D object transformed by the skeleton movement $260_1$ looks visually good, due to a correction of the first mesh $214_1$ using the weighted average of morph targets $260_2$. Additionally, for example, the morph targets can be used to adapt other parts of the object 212, e.g. the other arm and the belly of the object 212, e.g., parts of the object 212 which are not influenced by the skeleton transformation, but for which parts a volumetric scan of the 3D object indicates a difference in the mesh, e.g., resulting from clothing or an individual body shape of the 3D object 212.

Optionally, the reference pose information 260 further comprises an information $260_3$ on a 3D object global displacement and/or rotation and/or scaling to be applied to the first mesh $214_1$, e.g., as will be described with regard to FIG. 18 and FIG. 19.

The reference pose information 260 can be used to establishing the mapping from the first mesh $214_1$ to the second mesh $214_2$ with the first mesh $214_1$ assuming the reference pose 262. The reference pose 262 may correspond to the pose defined by the second mesh $214_2$. Therefore, the first mesh $214_1$ and the second mesh $214_2$ may be associated with the same pose at the mapping increasing the accuracy at the mapping. At the mapping a displacement between the two meshes $214_1$ and $214_2$ at the same pose, i.e. the reference pose 262, may be determined.

For example, the mapping represents a gluing of each vertex of the second mesh $214_2$ to a face of the first mesh $214_1$ indicated by the correspondence information 218 for the particular position and pose 262 of the second mesh $214_2$ at that time instant. At the mapping a distance of each vertex of the second mesh $214_2$ to the plane of its corresponding first mesh face can be determined and the position of the point onto which the vertex of the second mesh $214_2$ is projected within the associated face of the first mesh $214_1$ can be determined, i.e., the point within the face to which the distance is computed. With this parametrization between the two meshes $214_1$ and $214_2$, a transformation of the first mesh $214_1$ can directly be transferred to the second mesh $214_2$.

Transformations of a volumetric scan $214_2$ can be done as described above using a model $214_1$ that consist of a static topology and a volumetric scan video with additional information, e.g., the correspondence information 218, that allows transferring the transformation.

In order to be able to transfer a transformation of the model mesh $214_1$ onto the volumetric scan $214_2$, the player, e.g., the scene rendering apparatus 100, needs correspondences 218 and the pose 262 of the volumetric scan $214_2$. Thus, to the model mesh $214_1$ transformations, e.g., indicated by the reference pose information 260, corresponding to that particular pose 262 can be applied and based on the correspondences 218 the mapping from the model mesh $214_1$ to the volumetric scan $214_2$ can be established. Then when the real transformation, e.g., indicated by the moving information 240, is applied to the model mesh $214_1$ (either specified by animation or freely interactive determined by user input) the model $214_1$ can be transformed and based on the established model-volumetric video mapping the transformation can be transferred to the volumetric video $214_2$.

One problem is that by simply applying pose transformations by means of skeleton modifications $260_1$ that the mapping of the model $214_1$ to the volumetric scan $214_2$ at the pose 262 to which the volumetric scan $214_2$ applies could be erroneous, if the skinning process applied to get the model $214_1$ at such a pose 262 contains artifacts. The faces determined by the transformed vertices are not correct and therefore the entire mapping of model $214_1$ to volumetric scan $214_2$. Therefore, in one embodiment, pose-blend shape information $260_2$ that corrects such errors is provided as an extension of glTF for the volumetric video. An example is shown in FIG. 11. FIG. 11 shows as example of mapping to pose-blend shapes.

As seen in the example, the mesh $214_2$ of the volumetric scan that contains association information 270 to the model mesh $214_2$ (in the "mesh" attribute in the extension) and correspondence information 218. Also, it points to information 260 that indicates the pose 262 and weights to be used on pose-blend shapes $260_2$ for a particular pose 262. Alternatively, it is also possible that the pose 262 and weights to be used on pose-blend shapes $260_2$ for a particular pose 262 can be provided individually and not in the same track, i.e. the jointUpdateTrack. So basically, the information 260 containing the pose 262 (e.g. as samples in a track) is extended to provide information on the weights of pose-blend shapes 260$_2$ to be used to correct potential artifact coming from applying skinning, i.e. a correction offset mesh is applied to the mesh 214$_1$ of the object 212 based on the weights for pose-blend shapes 260$_2$ so that the result of skinning process is the correct one.

The sample entry would describe the format of the samples, indicating the presence of weights to determined pose-blend shape to be applied, see FIG. 12 and FIG. 13.

The samples are provided in tracks which stores the actual pose information for a particular time instant. The weights would be also present. See, for example, FIG. 13.

According to an embodiment the scene rendering apparatus 100 described with regard to FIG. 10 is configured to derive from the scene description data 200 second mesh updates on the second mesh 214$_2$ and, for each second mesh update, a corresponding reference pose information 260 on a movement of the first mesh 214$_1$ to assume a corresponding reference pose 262 fitting to the second mesh 214$_2$ as updated by the second mesh update. For example, a volumetric scan video of the object 212 may be provided by providing the second mesh information 210$b$ for a first frame of the volumetric scan video and by providing updates of the second mesh information 210$b$ for consecutive frames of the volumetric scan video. The pose of the object 212 changes during the volumetric scan video and thus, also the reference pose 262 for establishing the mapping between the first 214$_1$ and the second 214$_2$ mesh. In order to animate the movable 3D object 212 at a certain time frame of the volumetric scan video based on the moving information 240, it is advantageous to derive the mapping between the first mesh 214$_1$ and the second mesh 214$_2$ at the certain time frame, wherein an update of the second mesh information defines the second mesh 214$_2$ at the certain time frame. The new pose defined by the second mesh 214$_2$ may represent the new reference pose 262 and the scene description data 200 may comprise together with the update of the second mesh information 210$b$ an update of the reference pose information 260 defining pose movements 260$_1$ and 260$_2$ so that the first mesh 214$_1$ can assume the new reference pose 262 at the mapping. Note, this covers an embodiment related to having a frame/update of the second mesh 214$_2$, such as a volumetric scan, on a certain rate, which may be a lower rate when using, for instance, the technique of the embodiment described below, or the intended higher rate, such as every 1 second, wherein a free movement, according to user interaction, or better an alternative movement/pose sequence, may be generated by the scene rendering apparatus 100, by free transformation.

According to an embodiment the scene rendering apparatus 100 is configured to derive from the scene description data 200 a default movement of the movable 3D object 212, by defining a default skeleton movement of the moveable 3D object 212, e.g., for bridging the time till the next second mesh update, so as to sequentially assume default poses, e.g., the reference pose 262 may be one, or even the first, of the sequence of default poses, and by defining, for each default pose, an indication of a weighted average of the morph targets, e.g., thus, the compensation deformation for each default pose is composed of a weighted average of compensating deformations of the primitive poses. For example, the default movement can be used to move the 3D object 212 from a pose defined by the second mesh 214$_2$ to a pose defined by a subsequent second mesh, wherein the subsequent second mesh represents an update of the second mesh 214$_2$. The moveable 3D object 212 assumes sequentially the default poses between the two poses defined by the second mesh 214$_2$ and the subsequent second mesh. Thus a smooth transition between the two poses can be achieved, wherein the default skeleton movement together with the weighted average of the morph targets results in a high visual quality of the default movement of the movable 3D object 212, since the weighted morph targets can correct deficiencies, which may result from the default skeleton movement.

Note that a combination of the last two embodiments covers an embodiment related to having a frame/update of the second mesh 214$_2$, such as a volumetric scan, on a lower rate, such as every 1 second, while the movement in-between is defined by skeleton movement with the first mesh 214$_1$ being moved accordingly using skeleton movement, skinning and morph target correction to yield a higher movement rate of, for example, 60 fps; note that the second mesh 214$_2$ is, by the rendering apparatus, continuously moved to follow the first mesh's 214$_1$ movement by applying the established mapping onto the first mesh 214$_1$ to yield the corresponding second mesh 214$_2$ which then finally determines the object's hull at that time instant. This allows a smooth movement of the 3D object 212 also at a low frame rate of the volumetric scan video.

In the provided example shown in FIG. 13 the joint transformation is given as a matrix but different options could be possible. Note that the invention here applies to the weights and not to the joint transformation itself. The weight values would specify which weight to use for the predefined morph targets. In the example in FIG. 11, two morph targets are defined (see "target") and therefore 2 weights could be provided.

Note that in other cases, the number of morph targets/pose-blend shapes provided for a mesh 214$_1$ might be very high, e.g. in the order of 100-200 targets. In such a case it is envisioned that different correction offset mesh result of combining (weighting) several morph targets/pose-blend shapes consist of weighting a small subset of morph targets, e.g. in the range of 20-40. In such a case it would be more efficient to provide an index together with the weight to indicate which are the morph targets/pose-blend shapes used. See, for example, FIG. 14 and FIG. 15.

The samples are provided in tracks which stores the actual pose information for a particular time instant. The weights would be also present.

Note that this aspect of the invention can only be applied to animations when using morph targets. Also note that this aspect of subsetting morph-targets could be applied not only to the model 214$_1$ to volumetric scan 214$_2$ mapping aspect described with regard to FIGS. 10 to 13, i.e. when a model mesh 214$_1$ is transformed to the pose 262 of a volumetric scan video (e.g. indicating the pose 262 and weights for morph-targets by a metadata track) but also as a generic mechanism to subsetting morph-targets in animations in glTF. In such a case, an extension needs to be provided for animations as defined in glTF that allows partial weights of morph targets to be sent.

Figure 16:
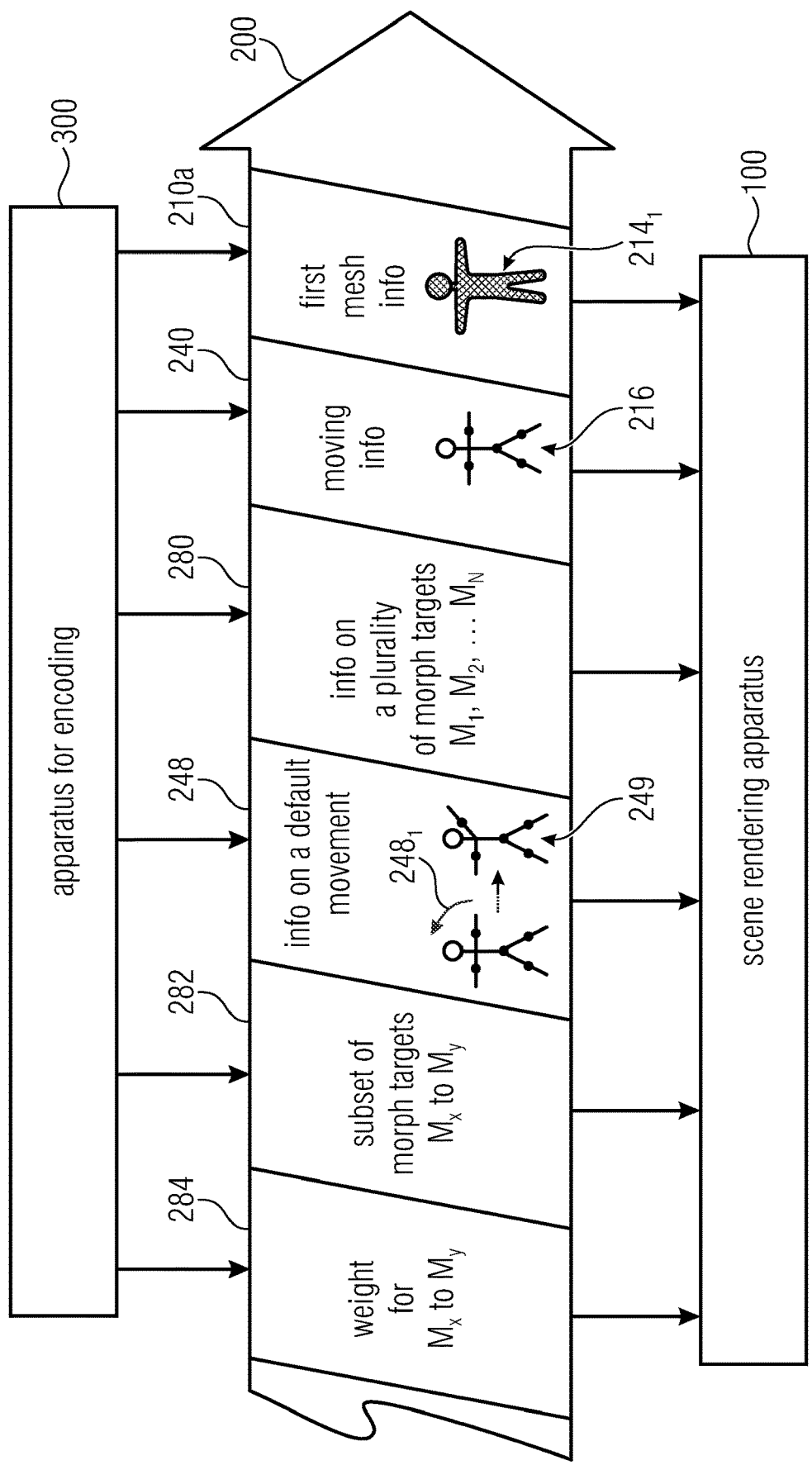
FIG. 16 shows an embodiment related to subsets of morph targets.

Accordingly FIG. 16 shows a scene rendering apparatus 100 for rendering a scene from a 3D scene description data 200. The scene rendering apparatus 100 is configured to derive, from the 3D scene description data 200, first mesh information 210$a$ and moving information 240, e.g., as described with regard to FIG. 10. Additionally, the scene rendering apparatus 100 is configured to derive information 280 on a plurality of morph targets $M_1$ to $M_N$. Each morph target $M_1$ to $M_N$ defines a compensating deformation of the first mesh $214_1$ for assuming a respective primitive pose like a sitting pose, a pose with a bended arm and/or leg and/or with a rotated torso and/or head, etc. For example, a skeleton movement together with a skinning transform can be applied to the object 212, so that the object 212 assumes a certain primitive pose. However, dependent on the skinning transform the hull, e.g. the first mesh $214_1$, may have visual artefacts after transforming the object 212 to the certain primitive pose. In order to correct the visual artefacts, one or more morph targets associated with the certain primitive pose can be applied to the first mesh $214_1$, e.g. to perform the compensating deformation. The one or more morph targets are provided by the plurality of morph targets $M_1$ to $M_N$. Each morph target of the plurality of morph targets $M_1$ to $M_N$ may be associated with a primitive pose.

Additionally, the scene description/rendering apparatus 100 is configured to further derive from the 3D scene description data 200 an information 248 on a default movement of the movable object 212. FIG. 16 exemplarily shows an upwards movement of an arm of the object 212 as the default movement. The information 248 on the default movement includes a default skeleton movement $248_1$ of the moveable object 212, so as to assume a default pose 249. Additionally, the scene rendering apparatus 100 is configured to further derive from the 3D scene description data 200, for the default pose 249, an indication 282 of a subset of morph targets $M_x$ to $M_y$ out of the plurality of morph targets $M_1$ to $M_N$, and for each morph target $M_x$ to $M_y$ of the subset, a weight 284. The subset of morph targets $M_x$ to $M_y$, weighted according to the weight 284 for each morph target $M_x$ to $M_y$ of the subset, is indicative of a composed compensating deformation of the first mesh $214_1$ for assuming the default pose 249. Thus, it is possible to combine and weight a small subset of morph targets resulting in an efficient compensating deformation and at the same time a high visual quality.

As shown in FIG. 16, the default pose 249 can correspond to a pose assumed by the object 212 after applying the default skeleton movement $248_1$ to the object 212. However, it is also possible that the default pose 249 corresponds to a pose at a beginning or during the default skeleton movement $248_1$. It might also be possible that the object 212 assumes two or more default poses during the application of the default movement, e.g., the default skeleton movement $248_1$ of the moveable object 212 may be defined so as to sequentially assume default poses by the movable object 212. The 3D scene description data 200 may comprise, for each of the default poses, an indication 282 of a subset $M_x$ to $M_y$ and, for each morph target $M_x$ to $M_y$ of the respective subset, a weight 284. Alternatively, the subsets of the morph targets for the default poses may be indicated collectively instead of individually for each default pose. However, the weight 284 for each morph target of the respective subset is indicated individually for each default pose.

According to an embodiment, the 3D scene description data 200 comprises the indication 282 of the subset of morph targets $M_x$ to $M_y$ in form of, for each morph target $M_x$ to $M_y$ of the subset, a morph target index, e.g. morph_target_index in FIG. 15, indexing the respective morph target $M_x$ to $M_y$ out of the plurality of morph targets $M_1$ to $M_N$.

Optionally, the 3D scene description data 200 may comprise second mesh information 210b and correspondence information 218, e.g., as described with regard to FIG. 10. Additionally, the 3D scene description data 200 may comprise second mesh updates on the second mesh $214_2$. The information 248 on the default movement of the movable object 212 may comprise the default skeleton movement $248_1$ of the moveable object 212 such that the movable object 212 assumes a default pose 249 per second mesh update, e.g., for each updated second mesh $214_2$ the information 248 comprises a default pose 249. The 3D scene description data 200 may comprise, for the default pose of each second mesh update, the indication 282 of the subset of morph targets $M_x$ to $M_y$ and the weight 284 for each morph target $M_x$ to $M_y$ of the subset or the 3D scene description data 200 may comprise the indication 282 of the subset of morph targets $M_x$ to $M_y$ once with respect to default poses 249 of more than one consecutive second mesh update and the weight 284 for each morph target $M_x$ to $M_y$ of the subset for the default pose 249 of each second mesh update individually.

A further consideration to be taken when it comes to the transformation applied to the model mesh $214_1$ is whether:
a) the pre-defined transformations are provided by means of morph-targets 282, joint/skeleton transformations $248_1$ and weights 284 so as to determine the correction offset mesh for a particular pose 249 to be applied in a timely manner based on the provided morph-targets 282 and respective weights 284
b) the pre-defined transformations are provided with less information and the player is able to derive the correction offset mesh to be used in a timely manner.

In case a) a conforming glTF file can be used without additional extensions in principle. However, in the second case i.e. b), if the player is able to compute the correction offset mesh for a particular pose by itself (i.e. without weights being provided to it), some information might be required.

For instance, the player might have integrated a Human Body Model (HBM) that is able to compute the correction offset mesh of a particular pose, as a combination of morph targets/pose-blend shapes, i.e. the player is able to derive the weights to be applied for a particular pose.

Since there might be different HBM, for instance requiring different number of morph-targets, in one embodiment, an attribute in glTF is provided to indicate that a model is used (e.g. HBM) and which one. This could be an enumerated list where 0 indicates e.g., SMPL model, and so on.

Figure 17:
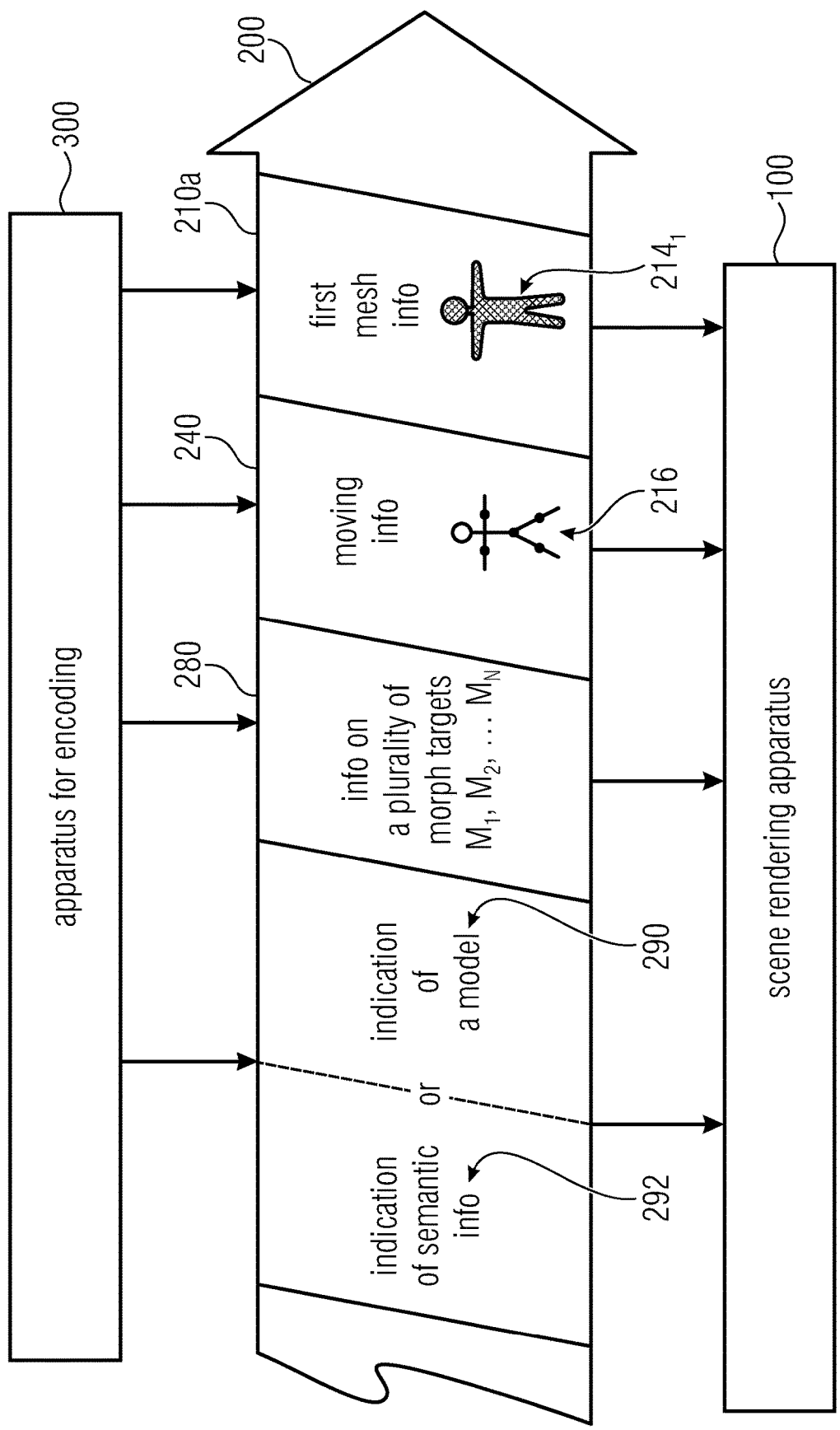
FIG. 17 shows an embodiment related to a timely derivation of weight for morph targets.

Accordingly, FIG. 17 shows a scene rendering apparatus 100 for rendering a scene from a 3D scene description data 200, configured to derive, from the 3D scene description data 200, the first mesh information 210a, the moving information 240 and the information 280 on the plurality of morph targets $M_1$ to $M_N$, e.g., as described with regard to FIG. 16. Additionally, the scene rendering apparatus 100 is configured to further derive from the 3D scene description data 200 an indication of
a model 290 to which the information 280 on the plurality of morph targets $M_1$ to $M_N$ refers, wherein the model 290 indicates as to how to form a weighted average of the plurality of morph targets $M_1$ to $M_N$ so as to indicate an influence of the first mesh $214_1$ by the skeleton 216 for a freely chosen pose of the movable 3D object 212, and/or a semantic information 292 which associates each of the plurality of morph targets $M_1$ to $M_N$ with a corresponding joint and discriminates between morph targets associated with one corresponding joint in terms of joint amount, type and/or direction of joint movement.

For example, the model can be used by the scene rendering apparatus 100 to determine weights for each morph target $M_1$ to $M_N$ of the plurality of morph targets $M_1$ to $M_N$ or only for a subset of morph targets of the plurality of morph targets $M_1$ to $M_N$. The scene rendering apparatus 100 may be configured to, using the model, determine how to combine and weight the plurality of morph targets $M_1$ to $M_N$ or only a subset of the plurality of morph targets $M_1$ to $M_N$.

The semantic information 292, for example, enables the scene rendering apparatus 100 to associate each morph target with a certain pose of the movable 3D object 212 by indicating to which joint of the movable 3D object 212 the respective morph target corresponds to and, for example, by further indicating a type of the joint, like a ball joint, a saddle joint, a hinge joint etc., and/or a direction of joint movement, like a direction of translation or rotation, etc., with which the respective morph target is associated.

It might be especially advantageous, if the scene description data 200 indicates the model 290 and the semantic information 292, so that the model 290 is configured to efficiently determine the relevant morph targets out of the plurality of morph targets based on the semantic information 292. This is based on the idea that the morph targets have to be selected for a certain pose, which is to be assumed by the object 212, e.g., according to the moving information 240, and that the semantic information 290 associates each morph target with a joint and provides information for which joint transformation of the respective joint the respective morph target is relevant. The semantic information may also improve the determination of weights for each morph target.

According to an embodiment the scene rendering/description apparatus 100 is configured to further derive from the 3D scene description data 200 a default movement 248 of the movable 3D object 212, by defining a default skeleton movement $248_1$ of the moveable 3D object 212, e.g. for bridging the time till the next second mesh update, so as to sequentially assume default poses 249, e.g. the reference pose may be one, or even the first, of the sequence of default poses, and, for each default pose 249, an indication of a weighted average of the morph targets, e.g. thus, the compensation deformation for each default pose 249 is composed of a weighted average of compensating deformations of the primitive poses. Alternatively, the scene rendering apparatus 100 is configured to further derive from the 3D scene description data 200 a default movement 248 of the movable 3D object 212, by defining a default skeleton movement $248_1$ of the moveable 3D object 212, e.g. for bridging the time till the next second mesh update, so as to sequentially assume default poses 249, e.g. the reference pose 249 may be one, or even the first, of the sequence of default poses, and, for each default pose 249, determining a weighted average of the morph targets by use of the model 290 and/or the semantic information 292.

According to an embodiment the scene description/rendering apparatus is configured to move the first mesh $214_1$ to a freely chosen pose by determining a weighted average of the morph targets based on the indication of the model 292 or semantic information 290, e.g., by using the model 292 or the semantic information 290.

Note also that morph targets could be used for different purposes, one being to be able to provide pose-blend shapes that allow computing the correction offset mesh for a particular pose as described above, but also to indicate a different body shape, etc. Therefore, in another embodiment further signaling is added to the glTF file to indicate which morph targets are pose-blend shapes and used for computation of respective correction offset mesh for a particular pose.

Finally, when several pose-blend shapes are provided to be used in a model 290, it is crucial for the model 290 to understand to which pose the provided pose-blend shape corresponds, i.e. to what skeleton transformation $248_1$ it applies, e.g., which pose-blend shape corresponds to bending the arm. In one embodiment a mapping of a pose-blend shape (or morph-target in the glTF file) to a joint is done. The semantic information 292 provides information on the mapping between a morph target, i.e., a pose blend shape, and a joint. So that it is clear that when such a joint is transformed (e.g. rotated or translated) the pose-blend shape that is mapped to that joint may be required to be applied. Additional information such as whether it corresponds to a translation or rotation and a direction thereof could be also provided, e.g., by the semantic information 292.

Typically, each model 290 would have a particular, order in which the pose-blend shapes are organized. In one embodiment, there is signaling in glTF that is used to indicate/derive the order of the morph-targets provided in the file and that follows the order in which the nodes are listed in the glTF file. Alternatively, the order of pose-blend shapes is provided in the order as specified by the HBM that is used. As a further alternative, the order known to be used in the HBM is explicitly indicated into the glTF file, i.e. for each morph-target that is included into the glTF file, an order_id value is indicated to be used when mapping the morph target to a particular pose-blend shape in the HBM.

According to an embodiment, the scene rendering apparatus 100 is configured to derive the information 280 on a plurality of morph targets $M_1$ to $M_N$ as a list of morph targets, and to associate the morph targets to predetermined morph targets according to a list order to morph target mapping which depends on the model 290. The model 290 has an order according to which predetermined morph targets are organized. However, the list of morph targets provided by the information 280 may provide the morph targets according to an order differing from the order of the model 290. The list order to morph target mapping can be used to associate a morph target of the list of morph targets to one of the predetermined morph targets. This enables the scene rendering apparatus 100 to order the list of morph targets according to the order of the corresponding predetermined morph targets of the model, wherein each morph target of the list of morph targets corresponds to one of the predetermined morph targets.

Note that the morph-targets discussed above are provided to compute a correction factor of the mesh $214_1$ so that once skinning is applied to that object 212, the transformed mesh does not contain any artifact. So basically, an offset of vertices of the mesh $214_1$ at a neutral pose are computed that need to be applied to that neutral posed mesh $214_1$, so that after the transformation of that mesh $214_1$ (e.g., through skinning) to a different pose, the transformed mesh looks artifact-free. In order to achieve, an artifact-free result, the morph-targets applied to the mesh $214_1$ need to be computed for the particular skinning that is applied, since different skinning methods, e.g. linear skinning vs. quaternion skinning, may have different artifacts and therefore different morph-targets are required. Therefore, in a further embodiment, an indication is provided indicating for which transformation method (e.g. linear skinning or quaternion skinning or any further) the morph-targets are provided for. Thus, the engine, i.e. the scene rendering apparatus 100, using the morph-targets knows how to properly use them, i.e. using the particular skinning method indicated.

According to an embodiment the scene description/rendering apparatus 100 is configured to further derive from the 3D scene description data 200 an indication as to which skinning transformation type the morph targets derived from the scene description data 200 relate to.

Figure 18:
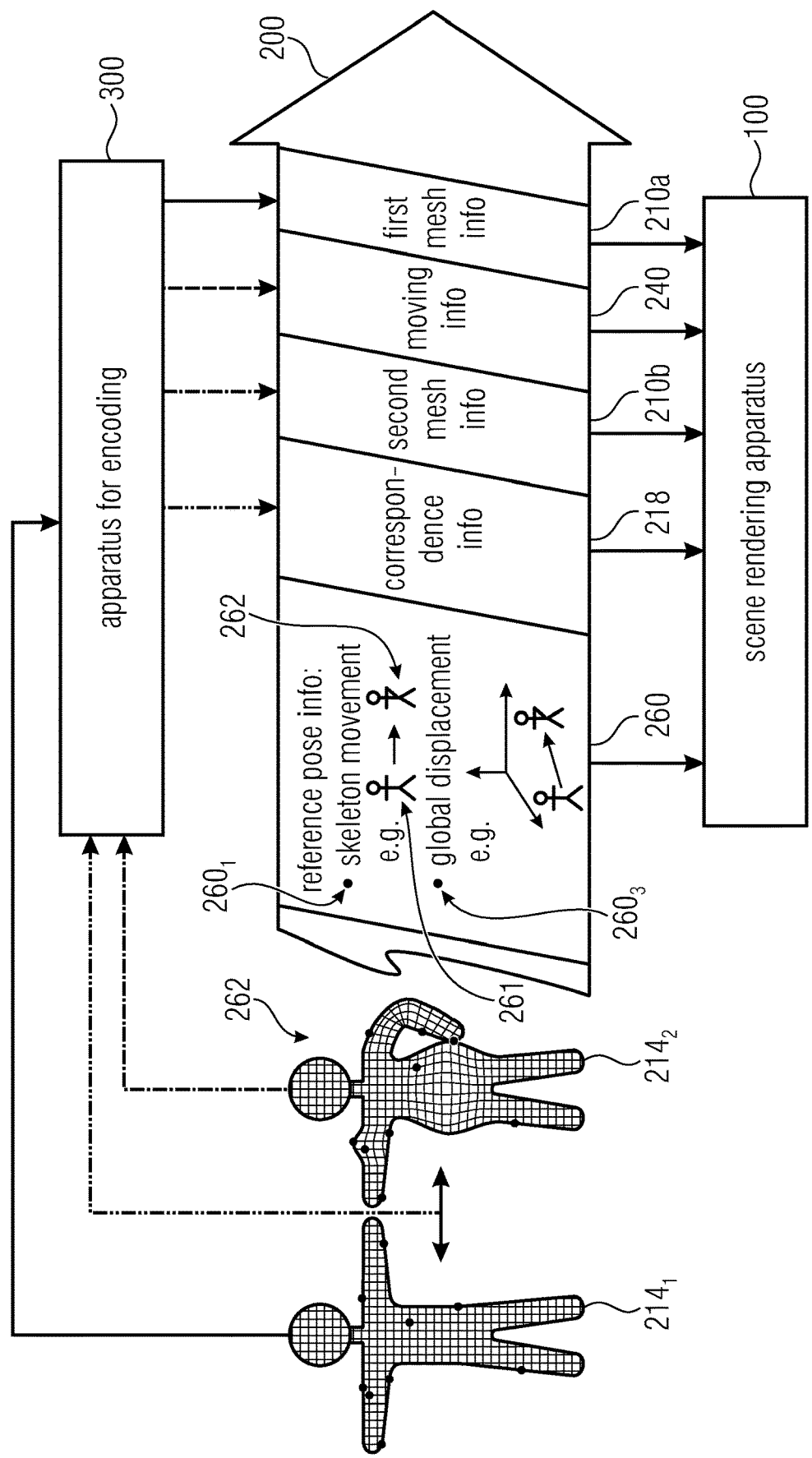
FIG. 18 shows an embodiment related to a mapping of two meshes using a global transformation of one mesh with a certain pose.

A further embodiment shown in FIG. 18 relates to a scene rendering apparatus 100 for rendering a scene from a 3D scene description data 200, configured to derive, from the 3D scene description data, the first mesh information 210a, the moving information 240, the second mesh information 210b and the correspondence information 218, e.g., as described with regard to FIG. 10. Additionally, the scene rendering apparatus 100 may be configured to derive from the 3D scene description 200, similarly as described with regard to FIG. 10, the reference pose information 260 on a movement of the first mesh $214_1$ to assume a reference pose. The reference pose information 260 described with regard FIG. 18 differs from the reference pose information 260 described with regard FIG. 10 in that the reference pose information 260 comprising not only a skeleton movement definition $260_1$, e.g., from a default pose 261 to a reference pose 262, but also an information $260_3$ on a 3D object global displacement and/or global rotation and/or global scaling to be applied to the first mesh $214_1$. Optionally, the reference pose information 260 described with regard FIG. 18 may additionally comprise the indication $260_2$ of a weighted average of morph targets, as described with regard to FIG. 10. Furthermore, the scene rendering apparatus 100 is configured to perform, using the reference pose information 260, the establishing of the mapping from the first mesh $214_1$ to the second mesh $214_2$ with the first mesh $214_1$ assuming the reference pose 262.

A last aspect related to animatable/transformable 3D volumetric objects is related to the transformation carried out. As described above, when using a model mesh $214_1$ with a static topology that is transformed and such transformation is transferred to the volumetric mesh $214_2$, mainly two things are required. First the correspondence values, e.g., defined by the correspondence information 218, that map vertices of the volumetric scan $214_2$ to faces of the model mesh $214_1$ need to be sent. Second, the pose 262 corresponding to the volumetric scan $214_2$ needs to be sent, e.g., as transformation of the joints, so that the model mesh $214_1$ is transformed at that particular pose 262 and the two meshes $214_1$ and $214_2$ are "glued" (e.g. computing a distance and a relative position of vertices of volumetric scan $214_2$ to the corresponding model mesh $214_1$ face). Then the animated model mesh $214_1$ at a different pose is used to transform that different pose to the volumetric scan $214_2$ that has been "glued" (e.g., using that distance and relative position). The different pose may be defined by the moving information 240.

The described transformation into a particular pose 262 can be done for instance using the JointsTransformationSample( ) described before, e.g., see FIG. 13 and FIG. 15. Such transformation can consist of by applying a 3D offset 212 (translation), rotation and scale (or all together as a matrix as shown in FIG. 13 and FIG. 15).

Representing a particular pose 262 of an object 212 typically involves using local coordinates, which means that the transformation applied to a joint, is local with respect to its parent joint, if any.

However, in order to apply such a "glueing" operation of the model mesh $214_1$ and the volumetric scan $214_2$ as described before, the vertex coordinates and joint coordinates of the model mesh $214_1$ need to be at the exact location that will perfectly align the posed model mesh $214_1$ with the scan mesh $214_2$ in 3D space.

The skinning operation only changes the pose of the template mesh $214_1$ (model mesh $214_1$ at neutral position, i.e. the default position 261) into the model mesh $214_1$, it cannot freely transform the mesh $214_1$ in 3D space. Moving, rotation, etc. into the 3D space is part of the global transformation $260_3$.

Therefore, in an embodiment, in addition to the joint values describing the pose 262 in each frame, a 3D transform, i.e. the global transform $260_3$ like a global translation and/or a global rotation and/or a global scaling, of the model mesh $214_1$ to align it with the scan $214_2$, when performing animation of volumetric video is provided. This is done by having an additional root node, that once the pose 262 is determined moves around the model mesh $214_1$ at the right pose 262 to the right position/orientation, etc. See, for example, also FIG. 19.

The example shown in FIG. 19 shows that a matrix contains the parameters for global transformation $260_3$, i.e. it is applied to the whole object 212, moving it around. In the example, it is shown as a matrix containing the transformation $260_3$ as a combination of translation, rotation, scaling. However, the syntax of the described samples could be provided separately as translation, rotation and/or scaling.

Any scene rendering apparatus 100 described herein may be configured to use the mapping from the first mesh $214_1$ to the second mesh $214_2$ for determining the second mesh $214_2$ relative to a moved version of the first mesh $214_1$.

In order to establish the mapping/linking between the first mesh $214_1$ and the second mesh $214_2$ at the current pose 262 of the second mesh $214_2$, the scene rendering apparatus 100 may be configured to transform the first mesh $214_1$ to the same position, e.g., using the information $260_3$ of the global transformation, and pose 262, e.g., using the skeleton movement $260_1$ and optionally a set of morph targets $260_2$, as the second mesh $214_2$. The information 260 regarding the reference pose may provide the position and pose of the second mesh $214_2$ by providing a skeleton movement $260_1$ indicating a transformation of nodes/joints associated with the second mesh $214_2$ and by providing a weighted average of morph targets, i.e. weights $260_2$ to be applied to the morph targets of the first mesh $214_1$. This transformation is performed as any other transformation by means of using mesh primitives for skinning and pose-dependent morph targets. Then, the correspondence values for each of the vertices in the second mesh $214_2$ indicating a mapping to a face of the first mesh $214_1$ can be used to determine the relative location of each vertex in the second mesh $214_2$ to the associated face of the first mesh 214 as explained above.

With the relative locations representing the linked meshes, as a second step the first mesh $214_1$ at its original position and pose is transformed as indicated by animations, e.g., the moving information 240. With the first mesh $214_1$ at the target position and pose 262, the second mesh $214_2$ is transformed by following the relative locations of each vertex with respect the associated faces of the first mesh $214_1$.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive 3D scene description data can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream, e.g., the 3D scene description data, or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A scene rendering apparatus for rendering a scene from a 3D scene description data, the apparatus configured to:
   derive, from the 3D scene description data, first data defining a movable 3D object, and second data defining a movability of the movable 3D object and movement constraint information which defines constraints for the movability of the movable 3D object.

2. The scene rendering apparatus of claim 1, configured to obey the constraints for the movability of the movable 3D object in moving the movable 3D object according to user interaction.

3. The scene rendering apparatus of claim 1, configured to derive from first data mesh information on a definition of a mesh of the movable 3D object and a definition of a skeleton of the movable 3D object.

4. The scene rendering apparatus of claim 3, configured to derive from the second data
   information on a plurality of morph targets, each morph target defining a compensating deformation of a first mesh for assuming a respective primitive pose and an indication of a subset of morph targets out of the plurality of morph targets, a usage of which is available in moving the movable 3D object during a time sub-period, while any morph targets not comprised by the subset is unavailable, wherein a persistence of the definition of the mesh of the movable 3D object, the definition of the skeleton of the movable 3D object and the information on a plurality morph targets exceed the time sub-period, and/or
   updates on an indication of a set of morph targets which define a compensating deformation of the first mesh for assuming a respective primitive pose, wherein the updates change the indication so that the set of morph targets temporally changes during the persistence of the definition of the mesh of the movable 3D object and the definition of the skeleton of the moveable 3D object.

5. The scene rendering apparatus of claim 4, configured to derive updates on the indication of the subset of morph targets so that the subset changes in consecutive time sub-periods.

6. The scene rendering apparatus of claim 3, configured to derive from the second data
   joint information on joints of the skeleton, and joint constraint information indicating a restriction of a space of freedom of the joints and/or indicating a selection out of the joints which are immobilized.

7. The scene rendering apparatus of claim 6, wherein the joint constraint information restricts the space of freedom of the joints by way of restricting an angular movability range of the joints.

8. The scene rendering apparatus of claim 6, wherein the joint constraint information restricts the space of freedom of the joints by way of restricting an translational movability range of the joints.

9. The scene rendering apparatus of claim 6, configured to derive updates of the joint constraint information so that the restriction of the space of freedom of the joints and/or the selection out of the joints which are immobilized temporally changes.

10. The scene rendering apparatus of claim 1, configured to derive from the second data
information on a plurality of morph targets associated with the movable 3D object for a time period and an indication of a subset of morph targets out of the plurality of morph targets, a usage of which is available in moving the movable 3D object during a time sub-period within the time period, while any morph target not comprised by the subset is unavailable, and/or
updates on an indication of a set of morph targets available in moving the movable 3D object, wherein the updates change the indication so that the set of morph targets temporally changes.

11. The scene rendering apparatus of claim 1, configured to derive from the second data
joint information on joints of the movable 3D object, and
joint constraint information indicating a restriction of a space of freedom of the joints and/or indicating a selection out of the joints which are immobilized.

12. The scene rendering apparatus of claim 1, configured to derive the movement constraint information from
an extension portion of a section of a glTF file of the 3D scene description data, the
section relating to the movable 3D object, or
a meta data track of the glTF file.

13. The scene rendering apparatus of claim 1, wherein
the 3D scene description data defines a default movement of the movable 3D object, and the movement constraint information defines the constraints for the movability of the movable 3D object relative to poses of the movable 3D object defined by the default movement.

14. A method for rendering a scene from a 3D scene description data, comprising deriving, from the 3D scene description data, first data defining a movable 3D object, and second data defining a movability of the movable 3D object and movement constraint information which defines constraints for the movability of the movable 3D object.

15. A non-transitory digital storage medium having a computer program stored thereon, when executed by a processor, to perform a method for rendering a scene from a 3D scene description data, comprising deriving, from the 3D scene description data, first data defining a movable 3D object, and second data defining a movability of the movable 3D object and movement constraint information which defines constraints for the movability of the movable 3D object.

* * * * *